US006260079B1

(12) United States Patent
White

(10) Patent No.: US 6,260,079 B1
(45) Date of Patent: Jul. 10, 2001

(54) METHOD AND SYSTEM FOR ENHANCING FIBRE CHANNEL LOOP RESILIENCY FOR A MASS STORAGE ENCLOSURE BY INCREASING COMPONENT REDUNDANCY AND USING SHUNT ELEMENTS AND INTELLIGENT BYPASS MANAGEMENT

(75) Inventor: James L White, Roseville, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/192,548

(22) Filed: Nov. 15, 1998

(51) Int. Cl.⁷ .................................................. G06F 3/00
(52) U.S. Cl. .................. 710/8; 710/14; 710/36; 710/38
(58) Field of Search .............. 710/1, 8, 36, 38, 710/14

(56) References Cited

U.S. PATENT DOCUMENTS

| 4,791,531 | * | 12/1988 | Jessup ................................. 361/395 |
| 5,262,990 | * | 11/1993 | Mills et al. ..................... 365/189.02 |
| 5,768,551 | | 6/1998 | Bleiweiss et al. .................. 395/311 |
| 5,787,265 | * | 7/1998 | Leshem ............................... 395/293 |
| 5,812,754 | | 9/1998 | Lui et al. .......................... 395/182.04 |
| 5,949,272 | * | 9/1999 | Bickford et al. ..................... 327/407 |
| 6,075,398 | * | 6/2000 | Furman ................................. 327/291 |

FOREIGN PATENT DOCUMENTS

| 0869641A2 | 10/1998 | (EP) ........................... H04L/12/433 |
| WO 97/07458 | 2/1997 | (WO) ............................. G06F/11/10 |
| WO 98/21660 | 5/1998 | (WO) ............................. G06F/13/00 |

OTHER PUBLICATIONS

Kembel, R.W.; In–Depth Fibre Channel Arbitrated Loop; 1997; ISBN 0–931836–81–6; Chapter 2, 2.9 pp. 42–43; Chapter 15, 15.1–15.5 pp. 269–281.

* cited by examiner

Primary Examiner—Thomas Lee
Assistant Examiner—Rehana Perveen

(57) ABSTRACT

A reliable and fault-tolerant multi-peripheral-device enclosure for use in high-availability computer systems. The reliable and fault-tolerant multi-peripheral-device enclosure uses a three-tiered port bypass control strategy for diagnosing and isolating malfunctioning peripheral devices within the multi-peripheral-device enclosure, and uses a similar a three-tiered port bypass control strategy for isolation of the entire multi-peripheral-device enclosure from a communications medium that interconnects the multi-peripheral-device enclosure with one or more host computers.

20 Claims, 19 Drawing Sheets

| INITIATOR | | TARGET | |
|---|---|---|---|
| STATE | EVENTS | EVENTS | STATE |
| BUS FREE 614 | | | BUS FREE |
| ARBITRATION 616 | ASSERT BSY AND D7 ASSERT SEL | | ARBITRATION |
| SELECTION 618 | ASSERT DX AND ATN | | SELECTION |
| SELECTION 620 | DROP BSY DROP SEL | ASSERT BSY | SELECTION |
| MESSAGE OUT 622 | IDENTIFY — DISCONNECT PRIVILEGE 625 / LUN 623 / 624 | | MESSAGE OUT |
| MESSAGE OUT | QUEUE TAG MESSAGE — SIMPLE QUEUE TAG / QUEUE TAG 626 / 627 | | MESSAGE OUT |
| COMMAND 628 | READ OR WRITE — 630 — OPCODE (READ OR WRITE) 632 / FLAGS / LOGICAL BLOCK NO. 636 / DATA LENGTH 638 | | COMMAND |
| MESSAGE IN 640 | | DISCONNECT 642 | MESSAGE IN |
| BUS FREE 644 | | DROP BSY | BUS FREE |

| INITIATOR | | TARGET | | |
|---|---|---|---|---|
| STATE | | | | STATE |
| BUS FREE 646 | | | | BUS FREE |
| ARBITRATION 648 | | ASSERT BSY AND DX ASSERT SEL AND I/O | | ARBITRATION |
| RESELECTION 650 | | ASSERT DX AND ATN DROP SEL | | RESELECTION |
| MESSAGE IN 652 | | IDENTIFY<br>LUN ~654 | | MESSAGE IN |
| MESSAGE IN | | QUEUE TAG MESSAGE<br>SIMPLE QUEUE TAG / QUEUE TAG ~656 | | MESSAGE IN |
| DATA IN (read) OUT (write) 658 | ACK DATA REQ<br>WRITE → / READ ← | | | DATA IN (read) OUT (write) |
| OPTIONAL DISCONNECT/ RECONNECT 660 | MESSAGE IN | SAVE POINTERS | MESSAGE IN | |
| | MESSAGE IN | DISCONNECT | MESSAGE IN | |
| | BUS FREE | | BUS FREE | |
| | ARBITRATION | | ARBITRATION | |
| | RESELECTION | | RESELECTION | |
| | MESSAGE IN | IDENTIFY | MESSAGE IN | |
| | MESSAGE IN | QUEUE TAG MESSAGE | MESSAGE IN | |
| DATA | ACK DATA REQ<br>WRITE → / READ ← | | | DATA |
| MESSAGE IN 662 | | DISCONNECT | | MESSAGE IN |
| BUS FREE 664 | | DROP BSY | | BUS FREE |

*Fig. 6B*

| INITIATOR | | TARGET | |
|---|---|---|---|
| state | | | state |
| BUS FREE 666 | | | BUS FREE |
| ARBITRATION 668 | | ASSERT BSY AND DX ASSERT SEL AND I/O | ARBITRATION |
| RESELECTION 670 | | ASSERT DX AND ATN DROP SEL | RESELECTION |
| MESSAGE IN 672 | IDENTIFY [ LUN ] ~674 | | MESSAGE IN |
| MESSAGE IN | QUEUE TAG MESSAGE [ SIMPLE QUEUE TAG \| QUEUE TAG ] ~676 | | MESSAGE IN |
| STATUS 678 | [ 00h ] ~680 | | STATUS |
| MESSAGE IN 682 | COMMAND COMPLETE [ 00h ] ~684 | | MESSAGE IN |
| BUS FREE 686 | | DROP BSY | BUS FREE |

*Fig. 6C*

METHOD AND SYSTEM FOR ENHANCING FIBRE CHANNEL LOOP RESILIENCY FOR A MASS STORAGE ENCLOSURE BY INCREASING COMPONENT REDUNDANCY AND USING SHUNT ELEMENTS AND INTELLIGENT BYPASS MANAGEMENT

TECHNICAL FIELD

The present invention relates to multi-peripheral-device enclosures, and, in particular, to a method and system for increasing the reliability and availability of multi-peripheral-device enclosures by incorporating control elements for isolating components.

BACKGROUND OF THE INVENTION

The fibre channel ("FC") is an architecture and protocol for a data communication network for interconnecting a number of different combinations of computers and peripheral devices. The FC supports a variety of upper-level protocols, including the small computer systems interface ("SCSI") protocol. A computer or peripheral device is linked to the network through an FC port and copper wires or optical fibres. An FC port includes a transceiver and an interface controller, and the computer peripheral device in which the FC port is contained is called a "host." The FC port exchanges data with the host via a local data bus, such as a peripheral computer interface ("PCI") bus. The interface controller conducts lower-level protocol exchanges between the fibre channel and the computer or peripheral device in which the FC port resides.

Because of the high bandwidth and flexible connectivity provided by the FC, the FC is becoming a common medium for interconnecting peripheral devices within multi-peripheral-device enclosures, such as redundant arrays of inexpensive disks ("RAIDs"), and for connecting multi-peripheral-device enclosures with one or more host computers. These multi-peripheral-device enclosures economically provide greatly increased storage capacities and built-in redundancy that facilitates mirroring and fail over strategies needed in high-availability systems. Although the FC is well-suited for this application with regard to capacity and connectivity, the FC is a serial communications medium. Malfunctioning peripheral devices and enclosures can, in certain cases, degrade or disable communications. A need has therefore been recognized for methods to improve the ability of FC-based multi-peripheral-device enclosures to isolate and recover from malfunctioning peripheral devices, and for improving the ability of systems including one or more host computers and multiple, interconnected FC-based multi-peripheral-device enclosures to isolate and recover from a malfunctioning multi-peripheral-device enclosure. A need has also been recognized for additional communications and component redundancies within multi-peripheral-device enclosures to facilitate higher levels of fault-tolerance and high-availability.

SUMMARY OF THE INVENTION

The present invention provides a method and system for isolating peripheral devices within a multi-peripheral-device enclosure from the communications medium used to interconnect the peripheral devices within the multi-peripheral-device enclosure, and for isolating a multi-peripheral-device enclosure from a communications medium used to interconnect a number of multi-peripheral-device enclosures with a host computer. The present invention provides increased component redundancy within multi-peripheral-device enclosures to eliminate single points of failure to increase fault-tolerance and high-availability of the multi-peripheral-device enclosures.

Port bypass circuits are used to control access of peripheral devices to the communications medium used to interconnect the peripheral devices within the multi-peripheral-device enclosure. The port bypass circuits are themselves controlled by port bypass circuit controllers that can, in turn, be controlled by software or firmware routines running on a microprocessor within the multi-peripheral-device enclosure. These three levels of control facilitate intelligent management of peripheral devices, diagnosis of malfunctioning peripheral devices, and isolation of malfunctioning peripheral devices. The three-tiered port bypass circuit control is also extended to inter-multi-peripheral-device-enclosure connection ports, so that a malfunctioning multi-peripheral-device enclosure can be diagnosed and isolated from a communications medium connection the multi-peripheral-device enclosure to a host computer. Redundant port bypass circuit controllers and microprocessors can be used to improve reliability of the diagnosis and isolation strategies implemented using the three-tiered port bypass circuit control.

BRIEF DESCRIPTION OF THE DRAWINGS

FIGS. 6A–6C illustrate the SCSI protocol involved in the initiation and implementation of read and write I/O operations.

DETAILED DESCRIPTION OF THE INVENTION

Figure 1A:
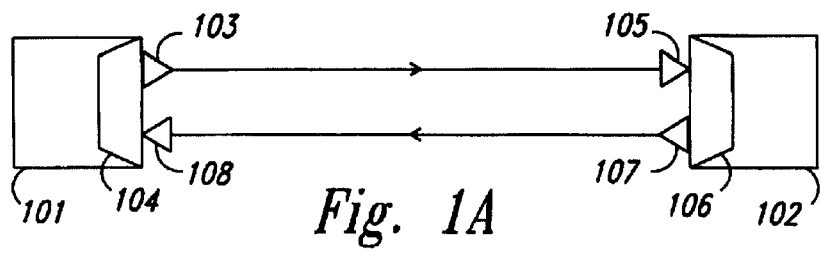
FIGS. 1A–1C shows the three different types of FC interconnection topologies.

The present invention will be described below in six subsections. The first three subsections provide greater detail about the fibre channel architecture and protocol, the SCSI architecture and protocol, and implementation of the SCSI protocol on top of the fibre channel protocol. The fourth subsection discusses the fibre channel arbitrated loop intialization process. The fifth subsection provides a general description of multi-peripheral-device enclosures, and the sixth subsection describes a specialized SCSI command set and protocol used for component management within systems of peripheral devices that communicate with one or more host computers via the SCSI protocol. The seventh subsection provides a detailed description of an embodiment of the present invention.

Fibre Channel

The Fibre Channel ("FC") is defined by, and described in, a number of ANSI Standards documents, including: (1) Fibre Channel Physical and Signaling Interface ("FC-PH"), ANSI X3.230-1994, ("FC-PH-2), ANSI X3.297-1997; (2) Fibre Channel—Arbitrated Loop ("FC-AL-2"), ANSI X3.272-1996; (3) Fibre Channel—Private Loop SCSI Direct Attached ("FC-PLDA"); (4) Fibre Channel—Fabric Loop Attachment ("FC-FLA"); (5) Fibre Channel Protocol for SCSI ("FCP"); (6) Fibre Channel Fabric Requirements ("FC-FG"), ANSI X3.289:1996; and (7) Fibre Channel 10-Bit Interface. These standards documents are under frequent revision. Additional Fibre Channel System Initiative ("FCSI") standards documents include: (1) Gigabaud Link Module Family ("GLM"), FCSI-301; (2) Common FC-PH Feature Sets Profiles, FCSI-101; and (3) SCSI Profile, FCSI-201. These documents may be found at the world wide web Internet page having the following address:

"http://www.fibrechannel.com"

The following description of the FC is meant to introduce and summarize certain of the information contained in these documents in order to facilitate discussion of the present invention. If a more detailed discussion of any of the topics introduced in the following description is desired, the above-mentioned documents may be consulted.

The FC is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibers. An FC node is connected to a communications medium via at least one FC port and FC link. An FC port is an FC host adapter or FC controller that shares a register and memory interface with the processing components of the FC node, and that implements, in hardware and firmware, the lower levels of the FC protocol. The FC node generally exchanges data and control information with the FC port using shared data structures in shared memory and using control registers in the FC port. The FC port includes serial transmitter and receiver components coupled to a communications medium via a link that comprises electrical wires or optical strands.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

Figure 1B:
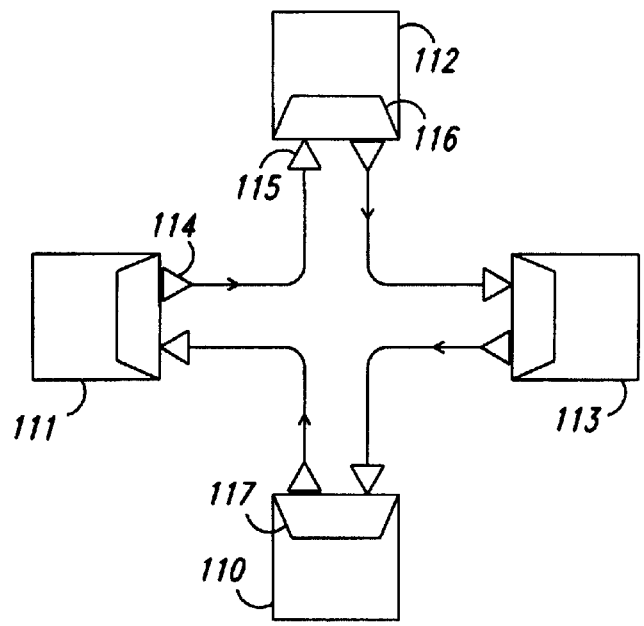
Figure 1C:
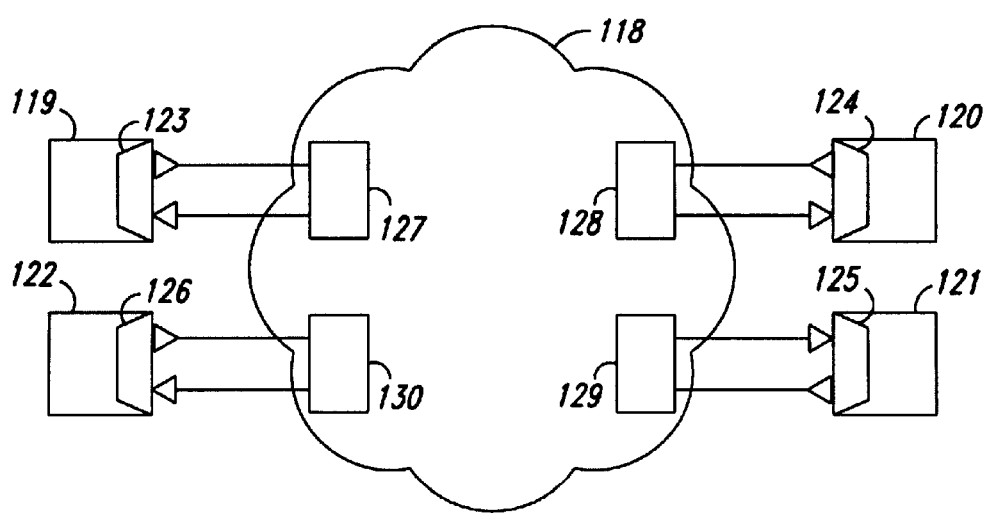

The FC architecture and protocol support three different types of interconnection topologies, shown in FIGS. 1A–1C. FIG. 1A shows the simplest of the three interconnected topologies, called the "point-to-point topology." In the point-to-point topology shown in FIG. 1A, a first node 101 is directly connected to a second node 102 by directly coupling the transmitter 103 of the FC port 104 of the first node 101 to the receiver 105 of the FC port 106 of the second node 102, and by directly connecting the transmitter 107 of the FC port 106 of the second node 102 to the receiver 108 of the FC port 104 of the first node 101. The ports 104 and 106 used in the point-to-point topology are called N_Ports.

FIG. 1B shows a somewhat more complex topology called the "FC arbitrated loop topology." FIG. 1B shows four nodes 110–113 interconnected within an arbitrated loop. Signals, consisting of electrical or optical binary data, are transferred from one node to the next node around the loop in a circular fashion. The transmitter of one node, such as transmitter 114 associated with node 111, is directly connected to the receiver of the next node in the loop, in the case of transmitter 114, with the receiver 115 associated with node 112. Two types of FC ports may be used to interconnect FC nodes within an arbitrated loop. The most common type of port used in arbitrated loops is called the "NL_Port." A special type of port, called the "FL_Port," may be used to interconnect an FC arbitrated loop with an FC fabric topology, to be described below. Only one FL_Port may be actively incorporated into an arbitrated loop topology. An FC arbitrated loop topology may include up to 127 active FC ports, and may include additional non-participating FC ports.

In the FC arbitrated loop topology, nodes contend for, or arbitrate for, control of the arbitrated loop. In general, the node with the lowest port address obtains control in the case that more than one node is contending for control. A fairness algorithm may be implemented by nodes to ensure that all nodes eventually receive control within a reasonable amount of time. When a node has acquired control of the loop, the node can open a channel to any other node within the arbitrated loop. In a half duplex channel, one node transmits and the other node receives data. In a full duplex channel, data may be transmitted by a first node and received by a second node at the same time that data is transmitted by the second node and received by the first node. For example, if, in the arbitrated loop of FIG. 1B, node 111 opens a full duplex channel with node 113, then data transmitted through that channel from node 111 to node 113 passes through NL_Port 116 of node 112, and data transmitted by node 113 to node 111 passes through NL_Port 117 of node 110.

FIG. 1C shows the most general and most complex FC topology, called an "FC fabric." The FC fabric is represented in FIG. 1C by the irregularly shaped central object 118 to which four FC nodes 119–122 are connected. The N_Ports 123–126 within the FC nodes 119–122 are connected to F_Ports 127–130 within the fabric 118. The fabric is a switched or cross-point switch topology similar in function to a telephone system. Data is routed by the fabric between F_Ports through switches or exchanges called "fabric elements." There may be many possible routes through the fabric between one F_Port and another F_Port. The routing of data and the addressing of nodes within the fabric associated with F_Ports are handled by the FC fabric, rather than by FC nodes or N_Ports.

When optical fibers are employed, a single FC fabric can extend for ten kilometers. The FC can support interconnection of more than 16,000,000 FC nodes. A single FC host adapter can transmit and receive data at rates of up to 200

Mbytes per second. Much higher data exchange rates are planned for FC components in the near future.

Figure 2:
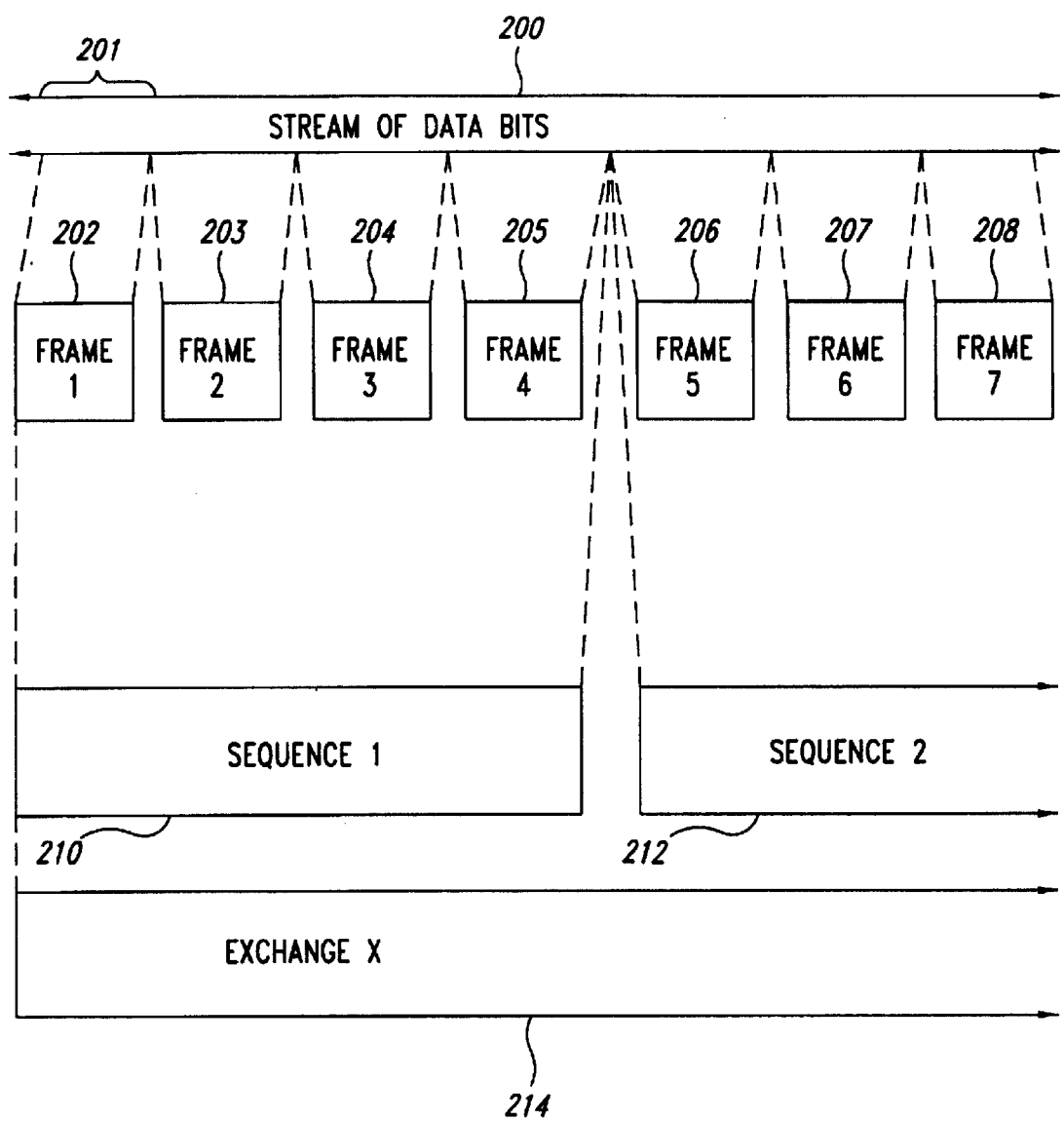
FIG. 2 illustrates a very simple hierarchy by which data is organized, in time, for transfer through an FC network.

The FC is a serial communications medium. Data is transferred one bit at a time at extremely high transfer rates. FIG. 2 illustrates a very simple hierarchy by which data is organized, in time, for transfer through an FC network. At the lowest conceptual level, the data can be considered to be a stream of data bits 200. The smallest unit of data, or grouping of data bits, supported by an FC network is a 10-bit character that is decoded by FC port as an 8-bit character. FC primitives are composed of 10-byte characters or bytes. Certain FC primitives are employed to carry control information exchanged between FC ports. The next level of data organization, a fundamental level with regard to the FC protocol, is a frame. Seven frames 202–208 are shown in FIG. 2. A frame may be composed of between 36 and 2,148 bytes of data, depending on the nature of the data included in the frame. The first FC frame, for example, corresponds to the data bits of the stream of data bits 200 encompassed by the horizontal bracket 201. The FC protocol specifies a next higher organizational level called the sequence. A first sequence 210 and a portion of a second sequence 212 are displayed in FIG. 2. The first sequence 210 is composed of frames one through four 202–205. The second sequence 212 is composed of frames five through seven 206–208 and additional frames that are not shown. The FC protocol specifies a third organizational level called the exchange. A portion of an exchange 214 is shown in FIG. 2. This exchange 214 is composed of at least the first sequence 210 and the second sequence 212 shown in FIG. 2. This exchange can alternatively be viewed as being composed of frames one through seven 202–208, and any additional frames contained in the second sequence 212 and in any additional sequences that compose the exchange 214.

The FC is a full duplex data transmission medium. Frames and sequences can be simultaneously passed in both directions between an originator, or initiator, and a responder, or target. An exchange comprises all sequences, and frames within the sequences, exchanged between an originator and a responder during a single I/O transaction, such as a read I/O transaction or a write I/O transaction. The FC protocol is designed to transfer data according to any number of higher-level data exchange protocols, including the Internet protocol ("IP"), the Small Computer Systems Interface ("SCSI") protocol, the High Performance Parallel Interface ("HIPPI"), and the Intelligent Peripheral Interface ("IPI"). The SCSI bus architecture will be discussed in the following subsection, and much of the subsequent discussion in this and remaining subsections will focus on the SCSI protocol embedded within the FC protocol. The standard adaptation of SCSI protocol to fibre channel is subsequently referred to in this document as "FCP.". Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC.

Figure 3:
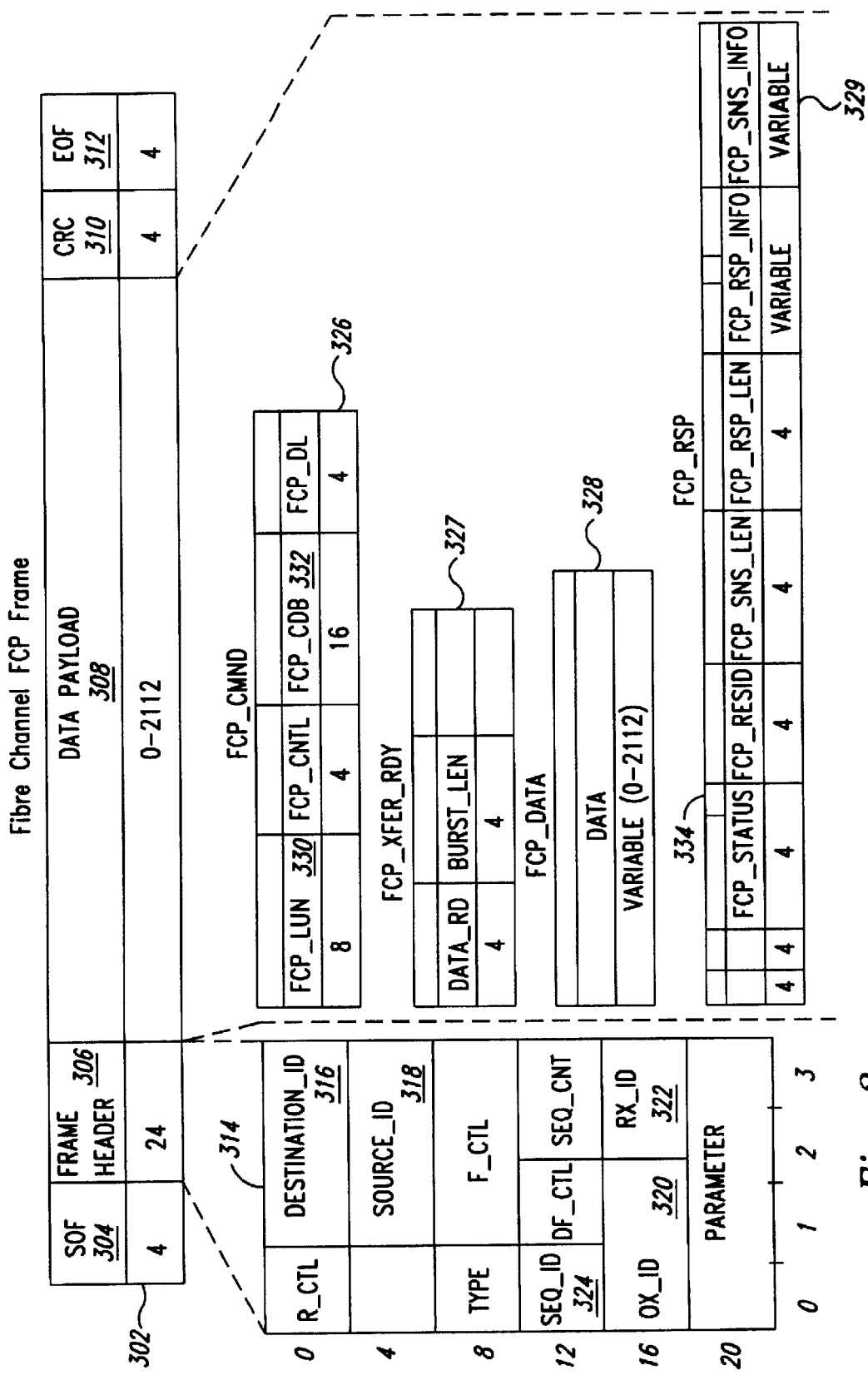
FIG. 3 shows the contents of a standard FC frame.

FIG. 3 shows the contents of a standard FC frame. The FC frame 302 comprises five high level sections 304, 306, 308, 310 and 312. The first high level section, called the start-of-frame deliminator 304, comprises 4 bytes that mark the beginning of the frame. The next high level section, called frame header 306, comprises 24 bytes that contain addressing information, sequence information, exchange information, and various control flags. A more detailed view of the frame header 314 is shown expanded from the FC frame 302 in FIG. 3. The destination identifier ("D_ID"), or DESTINATION_ID 316, is a 24-bit FC address indicating the destination FC port for the frame. The source identifier ("S_ID"), or SOURCE_ID 318, is a 24-bit address that indicates the FC port that transmitted the frame. The originator ID, or OX_ID 320, and the responder ID 322, or RX_ID, together compose a 32-bit exchange ID that identifies the exchange to which the frame belongs with respect to the originator, or initiator, and responder, or target, FC ports. The sequence ID, or SEQ_ID, 324 identifies the sequence to which the frame belongs.

The next high level section 308, called the data payload, contains the actual data packaged within the FC frame. The data payload contains data and encapsulating protocol information that is being transferred according to a higher-level protocol, such as IP and SCSI. FIG. 3 shows four basic types of data payload layouts 326–329 used for data transfer according to the SCSI protocol. The first of these formats 326, called the FCP_CMND, is used to send a SCSI command from an initiator to a target. The FCP_LUN field 330 comprises an 8-byte address that may, in certain implementations, specify a particular SCSI-bus adapter, a target device associated with that SCSI-bus adapter, and a logical unit number ("LUN") corresponding to a logical device associated with the specified target SCSI device that together represent the target for the FCP_CMND. In other implementations, the FCP_LUN field 330 contains an index or reference number that can be used by the target FC host adapter to determine the SCSI-bus adapter, a target device associated with that SCSI-bus adapter, and a LUN corresponding to a logical device associated with the specified target SCSI device. An actual SCSI command, such as a SCSI read or write I/O command, is contained within the 16-byte field FCP_CDB 332.

The second type of data payload format 327 shown in FIG. 3 is called the FCP_XFER_RDY layout. This data payload format is used to transfer a SCSI proceed command from the target to the initiator when the target is prepared to begin receiving or sending data. The third type of data payload format 328 shown in FIG. 3 is the FCP_DATA format, used for transferring the actual data that is being read or written as a result of execution of a SCSI I/O transaction. The final data payload format 329 shown in FIG. 3 is called the FCP_RSP layout, used to transfer a SCSI status byte 334, as well as other FCP status information, from the target back to the initiator upon completion of the I/O transaction.

The SCSI Bus Architecture

A computer bus is a set of electrical signal lines through which computer commands and data are transmitted between processing, storage, and input/output ("I/0") components of a computer system. The SCSI I/O bus is the most widespread and popular computer bus for interconnecting mass storage devices, such as hard disks and CD-ROM drives, with the memory and processing components of computer systems. The SCSI bus architecture is defined in three major standards: SCSI-1, SCSI-2 and SCSI-3. The SCSI-1 and SCSI-2 standards are published in the American National Standards Institute ("ANSI") standards documents "X3.131-1986," and "X3.131-1994," respectively. The SCSI-3 standard is currently being developed by an ANSI committee. An overview of the SCSI bus architecture is provided by "The SCSI Bus and IDE Interface," Freidhelm Schmidt, Addison-Wesley Publishing Company, ISBN 0-201-17514-2, 1997 ("Schmidt").

Figure 4:
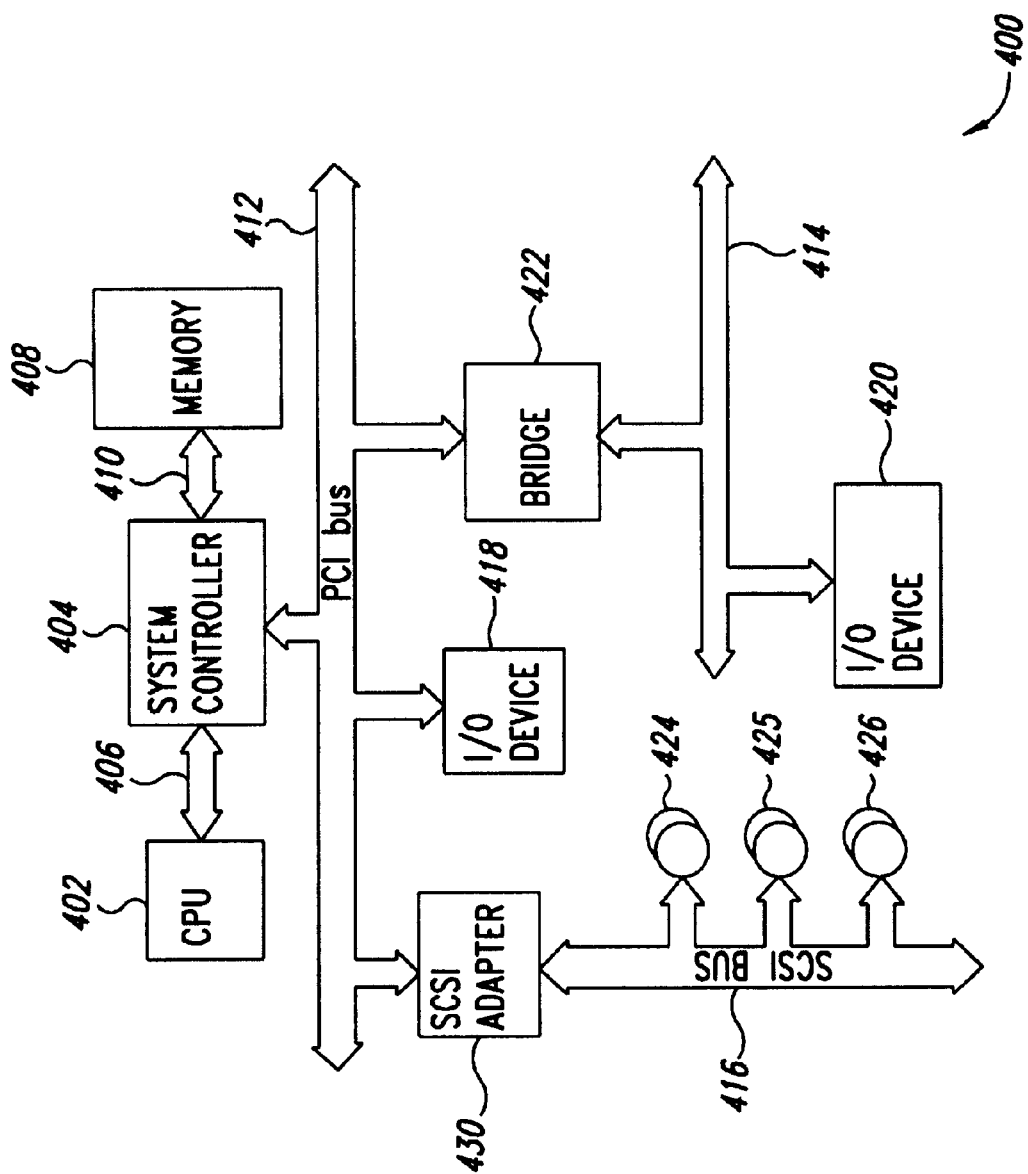
FIG. 4 is a block diagram of a common personal computer architecture including a SCSI bus.

FIG. 4 is a block diagram of a common personal computer ("PC") architecture including a SCSI bus. The PC 400 includes a central processing unit, or processor ("CPU") 402, linked to a system controller 404 by a high-speed CPU bus 406. The system controller is, in turn, linked to a system memory component 408 via a memory bus 410. The system controller 404 is, in addition, linked to various peripheral devices via a peripheral component interconnect ("PCI") bus 412 that is interconnected with a slower industry standard architecture ("ISA") bus 414 and a SCSI bus 416. The architecture of the PCI bus is described in "PCI System Architecture," Shanley & Anderson, Mine Share, Inc., Addison-Wesley Publishing Company, ISBN 0-201-40993-3, 1995. The interconnected CPU bus 406, memory bus 410, PCI bus 412, and ISA bus 414 allow the CPU to exchange data and commands with the various processing and memory components and I/O devices included in the computer system. Generally, very high-speed and high bandwidth I/O devices, such as a video display device 418, are directly connected to the PCI bus. Slow I/O devices 420, such as a keyboard 420 and a pointing device (not shown), are connected directly to the ISA bus 414. The ISA bus is interconnected with the PCI bus through a bus bridge component 422. Mass storage devices, such as hard disks, floppy disk drives, CD-ROM drives, and tape drives 424–426 are connected to the SCSI bus 416. The SCSI bus is interconnected with the PCI bus 412 via a SCSI-bus adapter 430. The SCSI-bus adapter 430 includes a processor component, such as processor selected from the Symbios family of 53C8xx SCSI processors, and interfaces to the PCI bus 412 using standard PCI bus protocols. The SCSI-bus adapter 430 interfaces to the SCSI bus 416 using the SCSI bus protocol that will be described, in part, below. The SCSI-bus adapter 430 exchanges commands and data with SCSI controllers (not shown) that are generally embedded within each mass storage device 424–426, or SCSI device, connected to the SCSI bus. The SCSI controller is a hardware/firmware component that interprets and responds to SCSI commands received from a SCSI adapter via the SCSI bus and that implements the SCSI commands by interfacing with, and controlling, logical devices. A logical device may correspond to one or more physical devices, or to portions of one or more physical devices. Physical devices include data storage devices such as disk, tape and CD-ROM drives.

Two important types of commands, called I/O commands, direct the SCSI device to read data from a logical device and write data to a logical device. An I/O transaction is the exchange of data between two components of the computer system, generally initiated by a processing component, such as the CPU 402, that is implemented, in part, by a read I/O command or by a write I/O command. Thus, I/O transactions include read I/O transactions and write I/O transactions.

The SCSI bus 416 is a parallel bus that can simultaneously transport a number of data bits. The number of data bits that can be simultaneously transported by the SCSI bus is referred to as the width of the bus. Different types of SCSI buses have widths of 8, 16 and 32 bits. The 16 and 32-bit SCSI buses are referred to as wide SCSI buses.

As with all computer buses and processors, the SCSI bus is controlled by a clock that determines the speed of operations and data transfer on the bus. SCSI buses vary in clock speed. The combination of the width of a SCSI bus and the clock rate at which the SCSI bus operates determines the number of bytes that can be transported through the SCSI bus per second, or bandwidth of the SCSI bus. Different types of SCSI buses have bandwidths ranging from less than 2 megabytes ("Mbytes") per second up to 40 Mbytes per second, with increases to 80 Mbytes per second and possibly 160 Mbytes per second planned for the future. The increasing bandwidths may be accompanied by increasing limitations in the physical length of the SCSI bus.

Figure 5:
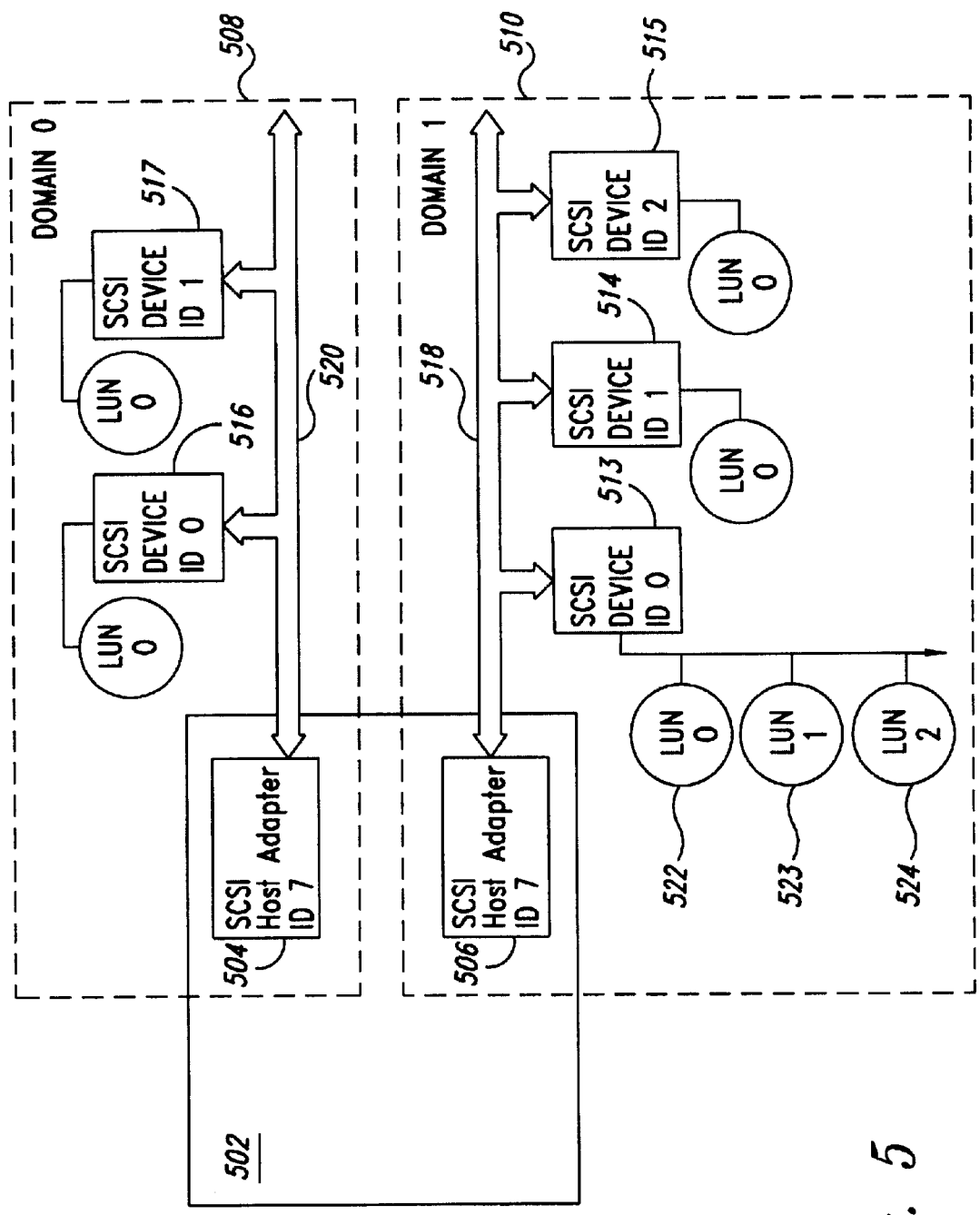
FIG. 5 illustrates the SCSI bus topology.

FIG. 5 illustrates the SCSI bus topology. A computer system 502, or other hardware system, may include one or more SCSI-bus adapters 504 and 506. The SCSI-bus adapter, the SCSI bus which the SCSI-bus adapter controls, and any peripheral devices attached to that SCSI bus together comprise a domain. SCSI-bus adapter 504 in FIG. 5 is associated with a first domain 508 and SCSI-bus adapter 506 is associated with a second domain 510. The most current SCSI-2 bus implementation allows fifteen different SCSI devices 513–515 and 516–517 to be attached to a single SCSI bus. In FIG. 5, SCSI devices 513–515 are attached to SCSI bus 518 controlled by SCSI-bus adapter 506, and SCSI devices 516–517 are attached to SCSI bus 520 controlled by SCSI-bus adapter 504. Each SCSI-bus adapter and SCSI device has a SCSI identification number, or SCSI_ID, that uniquely identifies the device or adapter in a particular SCSI bus. By convention, the SCSI-bus adapter has SCSI_ID 7, and the SCSI devices attached to the SCSI bus have SCSI_IDs ranging from 0 to 6 and from 8 to 15. A SCSI device, such as SCSI device 513, may interface with a number of logical devices, each logical device comprising portions of one or more physical devices. Each logical device is identified by a logical unit number ("LUN") that uniquely identifies the logical device with respect to the SCSI device that controls the logical device. For example, SCSI device 513 controls logical devices 522–524 having LUNs 0, 1, and 2, respectively. According to SCSI terminology, a device that initiates an I/O command on the SCSI bus is called an initiator, and a SCSI device that receives an I/O command over the SCSI bus that directs the SCSI device to execute an I/O operation is called a target.

In general, a SCSI-bus adapter, such as SCSI-bus adapters 504 and 506, initiates I/O operations by sending commands to target devices. The target devices 513–515 and 516–517 receive the I/0 commands from the SCSI bus. The target devices 513–515 and 516–517 then implement the commands by interfacing with one or more logical devices that they control to either read data from the logical devices and return the data through the SCSI bus to the initiator or to write data received through the SCSI bus from the initiator to the logical devices. Finally, the target devices 513–515 and 516–517 respond to the initiator through the SCSI bus with status messages that indicate the success or failure of implementation of the commands.

FIGS. 6A–6C illustrate the SCSI protocol involved in the initiation and implementation of read and write I/O operations. Read and write I/O operations compose the bulk of I/O operations performed by SCSI devices. Efforts to maximize the efficiency of operation of a system of mass storage devices interconnected by a SCSI bus are most commonly directed toward maximizing the efficiency at which read and write I/O operations are performed. Thus, in the discussions to follow, the architectural features of various hardware devices will be discussed in terms of read and write operations.

FIG. 6A shows the sending of a read or write I/O command by a SCSI initiator, most commonly a SCSI-bus adapter, to a SCSI target, most commonly a SCSI controller embedded in a SCSI device associated with one or more logical devices. The sending of a read or write I/O command is called the command phase of a SCSI I/O operation. FIG. 6A is divided into initiator 602 and target 604 sections by a central vertical line 606. Both the initiator and the target sections include columns entitled "state" 606 and 608 that describe the state of the SCSI bus and columns entitled "events" 610 and 612 that describe the SCSI bus events associated with the initiator and the target, respectively. The bus states and bus events involved in the sending of the I/O command are ordered in time, descending from the top of FIG. 6A to the bottom of FIG. 6A. FIGS. 6B–6C also adhere to this above-described format.

The sending of an I/O command from an initiator SCSI-bus adapter to a target SCSI device, illustrated in FIG. 6A, initiates a read or write I/O operation by the target SCSI device. Referring to FIG. 4, the SCSI-bus adapter 430 initiates the I/O operation as part of an I/O transaction. Generally, the SCSI-bus adapter 430 receives a read or write command via the PCI bus 412, system controller 404, and CPU bus 406, from the CPU 402 directing the SCSI-bus adapter to perform either a read operation or a write operation. In a read operation, the CPU 402 directs the SCSI-bus adapter 430 to read data from a mass storage device 424–426 and transfer that data via the SCSI bus 416, PCI bus 412, system controller 404, and memory bus 410 to a location within the system memory 408. In a write operation, the CPU 402 directs the system controller 404 to transfer data from the system memory 408 via the memory bus 410, system controller 404, and PCI bus 412 to the SCSI-bus adapter 430, and directs the SCSI-bus adapter 430 to send the data via the SCSI bus 416 to a mass storage device 424–426 on which the data is written.

FIG. 6A starts with the SCSI bus in the BUS FREE state 614, indicating that there are no commands or data currently being transported on the. SCSI device. The initiator, or SCSI-bus adapter, asserts the BSY, D7 and SEL signal lines of the SCSI bus in order to cause the bus to enter the ARBITRATION state 616. In this state, the initiator announces to all of the devices an intent to transmit a command on the SCSI bus. Arbitration is necessary because only one device may control operation of the SCSI bus at any instant in time. Assuming that the initiator gains control of the SCSI bus, the initiator then asserts the ATN signal line and the DX signal line corresponding to the target SCSI_ID in order to cause the SCSI bus to enter the SELECTION state 618. The initiator or target asserts and drops various SCSI signal lines in a particular sequence in order to effect a SCSI bus state change, such as the change of state from the ARBITRATION state 616 to the SELECTION state 618, described above. These sequences can be found in Schmidt and in the ANSI standards, and will therefore not be further described below.

When the target senses that the target has been selected by the initiator, the target assumes control 620 of the SCSI bus in order to complete the command phase of the I/O operation. The target then controls the SCSI signal lines in order to enter the MESSAGE OUT state 622. In a first event that occurs in the MESSAGE OUT state, the target receives from the initiator an IDENTIFY message 623. The IDENTIFY message 623 contains a LUN field 624 that identifies the LUN to which the command message that will follow is addressed. The IDENTIFY message 623 also contains a flag 625 that is generally set to indicate to the target that the target is authorized to disconnect from the SCSI bus during the target's implementation of the I/O command that will follow. The target then receives a QUEUE TAG message 626 that indicates to the target how the I/O command that will follow should be queued, as well as providing the target with a queue tag 627. The queue tag is a byte that identifies the I/O command. A SCSI-bus adapter can therefore currently manage 656 different I/O commands per LUN. The combination of the SCSI_ID of the initiator SCSI-bus adapter, the SCSI_ID of the target SCSI device, the target LUN, and the queue tag together comprise an I_T_L_Q nexus reference number that uniquely identifies the I/O operation corresponding to the I/O command that will follow within the SCSI bus. Next, the target device controls the SCSI bus signal lines in order to enter the COMMAND state 628. In the COMMAND state, the target solicits and receives from the initiator the I/O command 630. The I/O command 630 includes an opcode 632 that identifies the particular command to be executed, in this case a read command or a write command, a logical block number 636 that identifies the logical block of the logical device that will be the beginning point of the read or write operation specified by the command, and a data length 638 that specifies the number of blocks that will be read or written during execution of the command.

When the target has received and processed the I/O command, the target device controls the SCSI bus signal lines in order to enter the MESSAGE IN state 640 in which the target device generally sends a disconnect message 642 back to the initiator device. The target disconnects from the SCSI bus because, in general, the target will begin to interact with the logical device in order to prepare the logical device for the read or write operation specified by the command. The target may need to prepare buffers for receiving data, and, in the case of disk drives or CD-ROM drives, the target device may direct the logical device to seek to the appropriate block specified as the starting point for the read or write command. By disconnecting, the target device frees up the SCSI bus for transportation of additional messages, commands, or data between the SCSI-bus adapter and the target devices. In this way, a large number of different I/O operations can be concurrently multiplexed over the SCSI bus. Finally, the target device drops the BSY signal line in order to return the SCSI bus to the BUS FREE state 644.

The target device then prepares the logical device for the read or write operation. When the logical device is ready for reading or writing data, the data phase for the I/O operation ensues. FIG. 6B illustrates the data phase of a SCSI I/O operation. The SCSI bus is initially in the BUS FREE state 646. The target device, now ready to either return data in response to a read I/O command or accept data in response to a write I/O command, controls the SCSI bus signal lines in order to enter the ARBITRATION state 648. Assuming that the target device is successful in arbitrating for control of the SCSI bus, the target device controls the SCSI bus signal lines in order to enter the RESELECTION state 650. The RESELECTION state is similar to the SELECTION state, described in the above discussion of FIG. 6A, except that it is the target device that is making the selection of a SCSI-bus adapter with which to communicate in the RESELECTION state, rather than the SCSI-bus adapter selecting a target device in the SELECTION state.

Once the target device has selected the SCSI-bus adapter, the target device manipulates the SCSI bus signal lines in order to cause the SCSI bus to enter the MESSAGE IN state 652. In the MESSAGE IN state, the target device sends both an IDENTIFY message 654 and a QUEUE TAG message 656 to the SCSI-bus adapter. These messages are identical to the IDENTITY and QUEUE TAG messages sent by the initiator to the target device during transmission of the I/O command from the initiator to the target, illustrated in FIG. 6A. The initiator may use the I_T_L_Q nexus reference number, a combination of the SCSI_IDs of the initiator and target device, the target LUN, and the queue tag contained in the QUEUE TAG message, to identify the I/O transaction for which data will be subsequently sent from the target to the initiator, in the case of a read operation, or to which data will be subsequently transmitted by the initiator, in the case of a write operation. The I_T_L_Q nexus reference number is thus an I/O operation handle that can be used by the SCSI-bus adapter as an index into a table of outstanding I/O commands in order to locate the appropriate buffer for receiving data from the target device, in case of a read, or for transmitting data to the target device, in case of a write.

After sending the IDENTIFY and QUEUE TAG messages, the target device controls the SCSI signal lines in order to transition to a DATA state 658. In the case of a read I/O operation, the SCSI bus will transition to the DATA IN state. In the case of a write I/O operation, the SCSI bus will transition to a DATA OUT state. During the time that the SCSI bus is in the DATA state, the target device will transmit, during each SCSI bus clock cycle, a data unit having a size, in bits, equal to the width of the particular SCSI bus on which the data is being transmitted. In general, there is a SCSI bus signal line handshake involving the signal lines ACK and REQ as part of the transfer of each unit of data. In the case of a read I/O command, for example, the target device places the next data unit on the SCSI bus and asserts the REQ signal line. The initiator senses assertion of the REQ signal line, retrieves the transmitted data from the SCSI bus, and asserts the ACK signal line to acknowledge receipt of the data. This type of data transfer is called asynchronous transfer. The SCSI bus protocol also allows for the target device to transfer a certain number of data units prior to receiving the first acknowledgment from the initiator. In this transfer mode, called synchronous transfer, the latency between the sending of the first data unit and receipt of acknowledgment for that transmission is avoided. During data transmission, the target device can interrupt the data transmission by sending a SAVE POINTERS message followed by a DISCONNECT message to the initiator and then controlling the SCSI bus signal lines to enter the BUS FREE state. This allows the target device to pause in order to interact with the logical devices which the target device controls before receiving or transmitting further data. After disconnecting from the SCSI bus, the target device may then later again arbitrate for control of the SCSI bus and send additional IDENTIFY and QUEUE TAG messages to the initiator so that the initiator can resume data reception or transfer at the point that the initiator was interrupted. An example of disconnect and reconnect 660 are shown in FIG. 3B interrupting the DATA state 658. Finally, when all the data for the I/O operation has been transmitted, the target device controls the SCSI signal lines in order to enter the MESSAGE IN state 662, in which the target device sends a DISCONNECT message to the initiator, optionally preceded by a SAVE POINTERS message. After sending the DISCONNECT message, the target device drops the BSY signal line so the SCSI bus transitions to the BUS FREE state 664.

Following the transmission of the data for the I/O operation, as illustrated in FIG. 6B, the target device returns a status to the initiator during the status phase of the I/O operation. FIG. 6C illustrates the status phase of the I/O operation. As in FIGS. 6A–6B, the SCSI bus transitions from the BUS FREE state 666 to the ARBITRATION state 668, RESELECTION state 670, and MESSAGE IN state 672, as in FIG. 3B. Following transmission of an IDENTIFY message 674 and QUEUE TAG message 676 by the target to the initiator during the MESSAGE IN state 672, the target device controls the SCSI bus signal lines in order to enter the STATUS state 678. In the STATUS state 678, the target device sends a single status byte 684 to the initiator to indicate whether or not the I/O command was successfully completed. In FIG. 6C, the status byte 680 corresponding to a successful completion, indicated by a status code of 0, is shown being sent from the target device to the initiator. Following transmission of the status byte, the target device then controls the SCSI bus signal lines in order to enter the MESSAGE IN state 682, in which the target device sends a COMMAND COMPLETE message 684 to the initiator. At this point, the I/O operation has been completed. The target device then drops the BSY signal line so that the SCSI bus returns to the BUS FREE state 686. The SCSI-bus adapter can now finish its portion of the I/O command, free up any internal resources that were allocated in order to execute the command, and return a completion message or status back to the CPU via the PCI bus.

Mapping the SCSI Protocol onto FCP

Figure 7A:
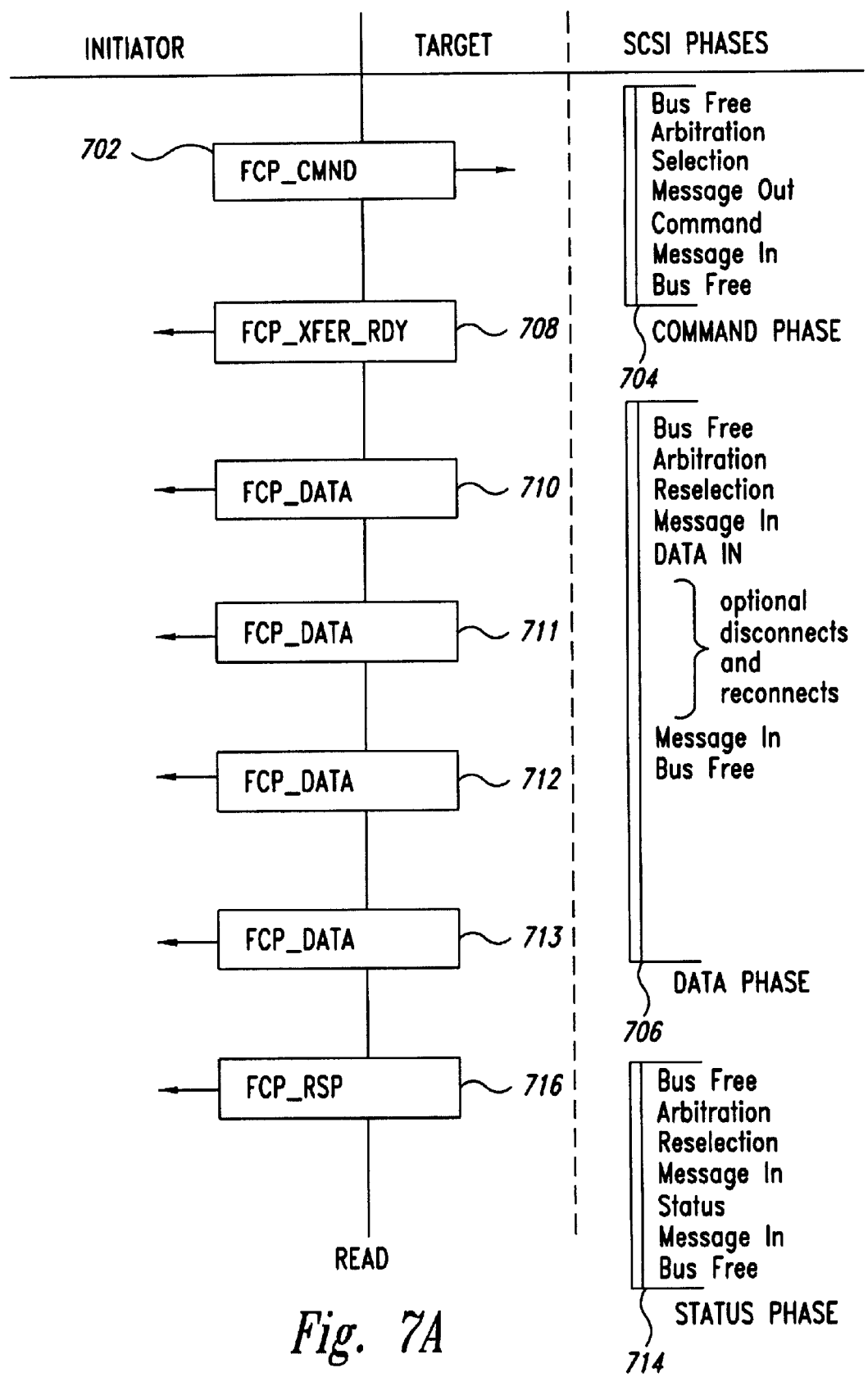
FIGS. 7A and 7B illustrate a mapping of FCP sequences exchanged between an initiator and target and the SCSI bus phases and states described in FIGS. 6A–6C.
Figure 7B:
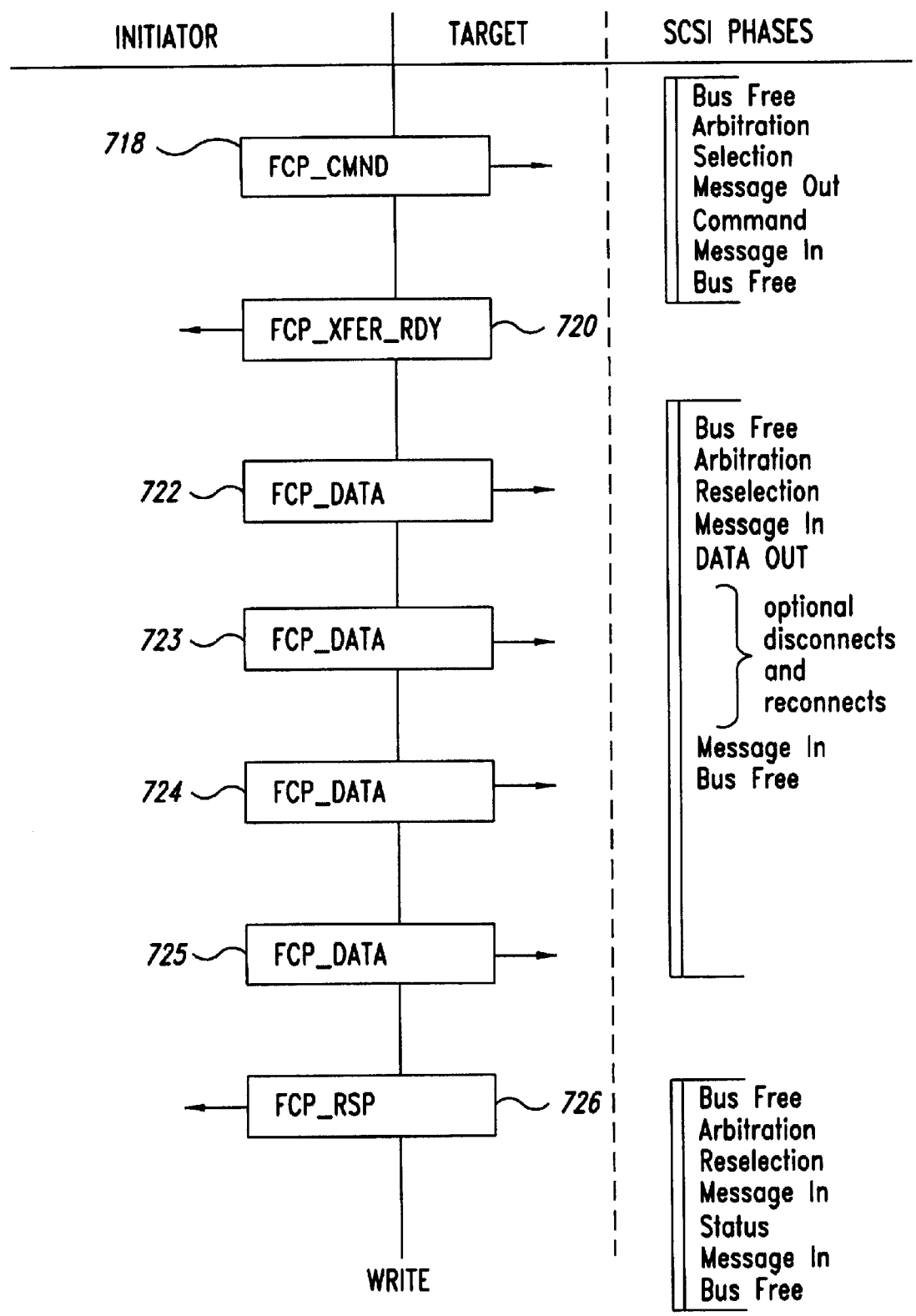

FIGS. 7A and 7B illustrate a mapping of FCP sequences exchanged between an initiator and target and the SCSI bus phases and states described in FIGS. 6A–6C. In FIGS. 7A–7B, the target SCSI adapter is assumed to be packaged together with a FCP host adapter, so that the target SCSI adapter can communicate with the initiator via the FC and with a target SCSI device via the SCSI bus. FIG. 7A shows a mapping between FCP sequences and SCSI phases and states for a read I/O transaction. The transaction is initiated when the initiator sends a single-frame FCP sequence containing a FCP_CMND data payload through the FC to a target SCSI adapter 702. When the target SCSI-bus adapter receives the FCP_CMND frame, the target SCSI-bus adapter proceeds through the SCSI states of the command phase 704 illustrated in FIG. 6A, including ARBITRATION, RESELECTION, MESSAGE OUT, COMMAND, and MESSAGE IN. At the conclusion of the command phase, as illustrated in FIG. 6A, the SCSI device that is the target of the I/O transaction disconnects from the SCSI bus in order to free up the SCSI bus while the target SCSI device prepares to execute the transaction. Later, the target SCSI device rearbitrates for SCSI bus control and begins the data phase of the I/O transaction 706. At this point, the SCSI-bus adapter may send a FCP_XFER_RDY single-frame sequence 708 back to the initiator to indicate that data transmission can now proceed. In the case of a read I/O transaction, the FCP_XFER_RDY single-frame sequence is optional. As the data phase continues, the target SCSI device begins to read data from a logical device and transmit that data over the SCSI bus to the target SCSI-bus adapter. The target SCSI-bus adapter then packages the data received from the target SCSI device into a number of FCP_DATA frames that together compose the third sequence of the exchange corresponding to the I/O read transaction, and transmits those FCP_DATA frames back to the initiator through the FC. When all the data has been transmitted, and the target SCSI device has given up control of the SCSI bus, the target SCSI device then again arbitrates for control of the SCSI bus to initiate the status phase of the I/O transaction 714. In this phase, the SCSI bus transitions from the BUS FREE state through the ARBITRATION, RESELECTION, MESSAGE IN, STATUS, MESSAGE IN and BUS FREE states, as illustrated in FIG. 3C, in order to send a SCSI status byte from the target SCSI device to the target SCSI-bus adapter. Upon receiving the status byte, the target SCSI-bus adapter packages the status byte into an FCP_RSP single-frame sequence 716 and transmits the FCP_RSP single-frame sequence back to the initiator through the FC. This completes the read I/O transaction.

In many computer systems, there may be additional internal computer buses, such as a PCI bus, between the target FC host adapter and the target SCSI-bus adapter. In other words, the FC host adapter and SCSI adapter may not be packaged together in a single target component. In the interest of simplicity, that additional interconnection is not shown in FIGS. 7A–B.

FIG. 7B shows, in similar fashion to FIG. 7A, a mapping between FCP sequences and SCSI bus phases and states during a write I/O transaction indicated by a FCP_CMND frame 718. FIG. 7B differs from FIG. 7A only in the fact that, during a write transaction, the FCP_DATA frames 722–725 are transmitted from the initiator to the target over the FC and the FCP_XFER_RDY single-frame sequence 720 sent from the target to the initiator 720 is not optional, as in the case of the read I/O transaction, but is instead mandatory. As in FIG. 7A, the write I/O transaction includes when the target returns an FCP_RSP single-frame sequence 726 to the initiator.

Arbitrated Loop Initialization

As discussed above, the FC frame header contains fields that specify the source and destination fabric addresses of the FC frame. Both the D_ID and the S_ID are 3-byte quantities that specify a three-part fabric address for a particular FC port. These three parts include specification of an FC domain, an FC node address, and an FC port within the FC node. In an arbitrated loop topology, each of the 127 possible active nodes acquires, during loop initialization, an arbitrated loop physical address ("AL_PA"). The AL_PA is a 1-byte quantity that corresponds to the FC port specification within the D_ID and S_ID of the FC frame header. Because there are at most 127 active nodes interconnected by an arbitrated loop topology, the single byte AL_PA is sufficient to uniquely address each node within the arbitrated loop.

Figure 8:
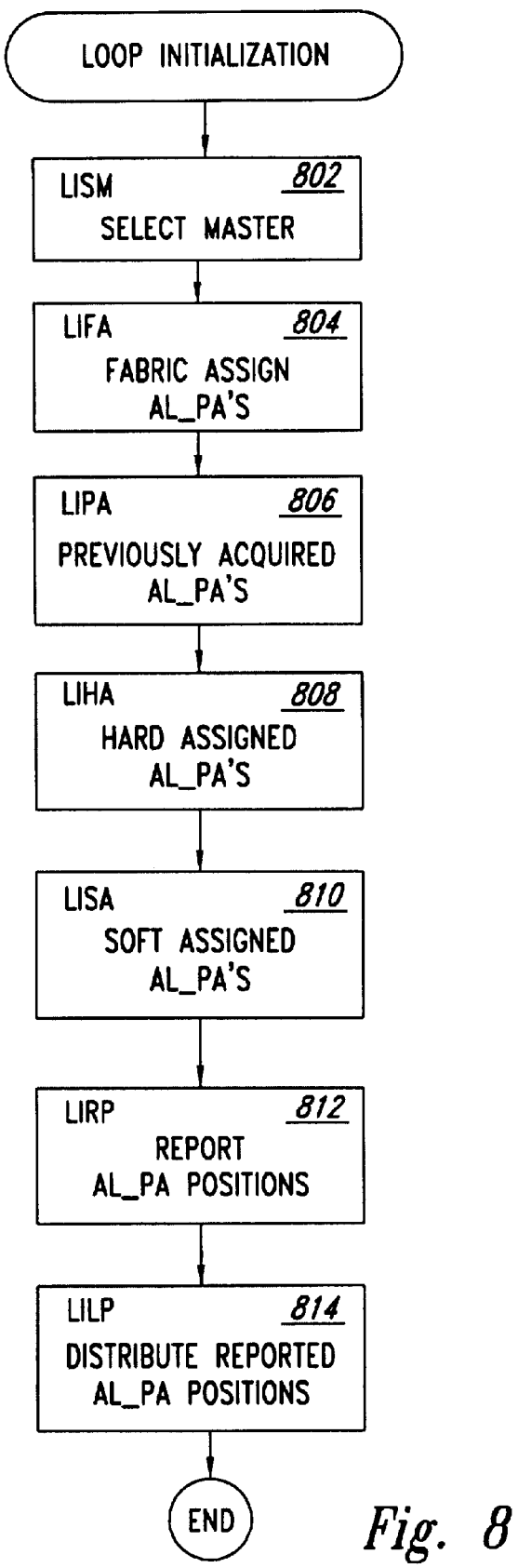
FIG. 8 shows a diagram of the seven phases of FC arbitrated loop initialization.
Figure 9:
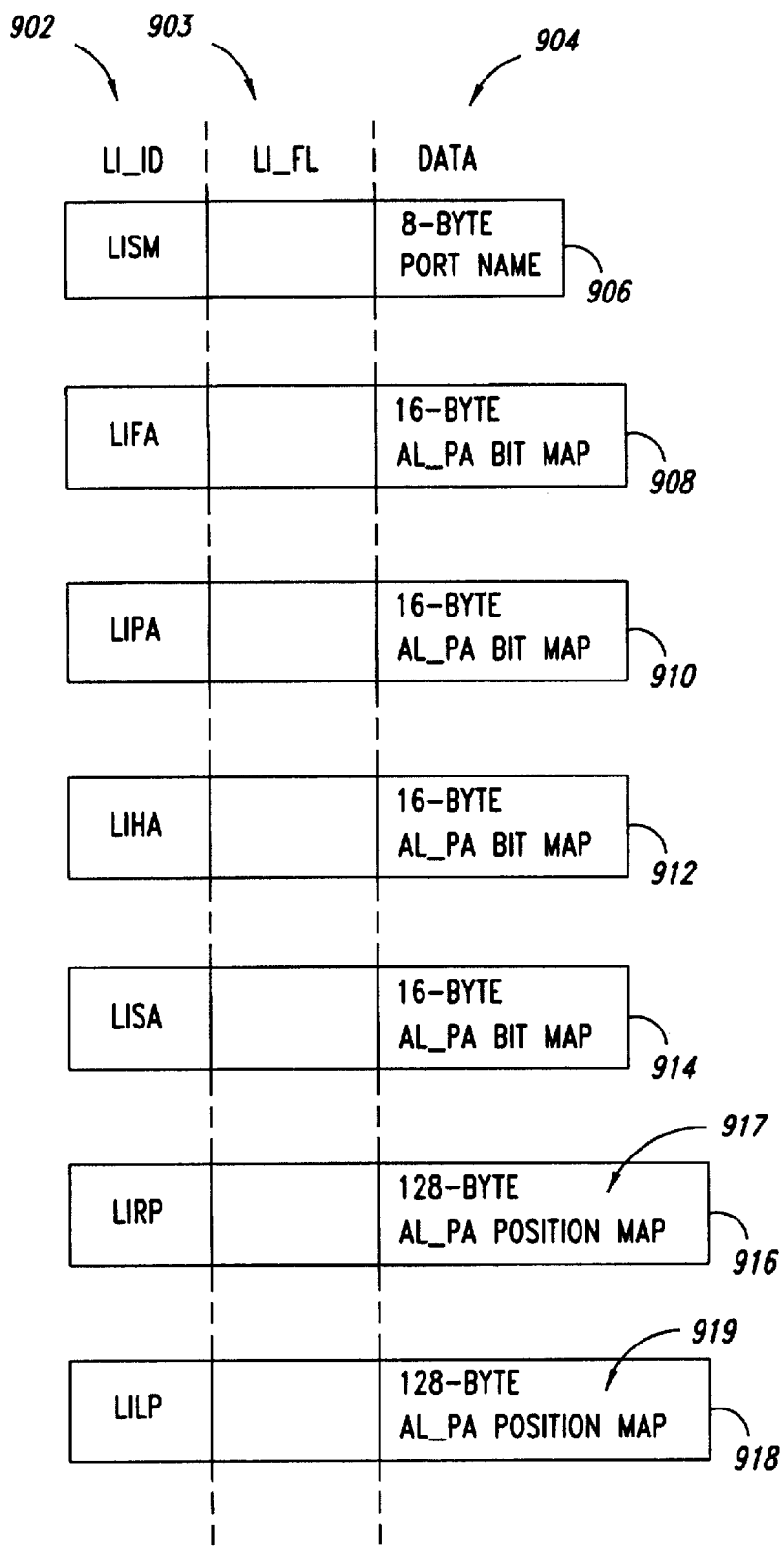
FIG. 9 shows the data payload of FC frames transmitted by FC nodes in an arbitrated loop topology during each of the seven phases of loop initialization shown in FIG. 9.

The loop initialization process may be undertaken by a node connected to an arbitrated loop topology for any of a variety of different reasons, including loop initialization following a power reset of the node, initialization upon start up of the first node of the arbitrated loop, subsequent inclusion of an FC node into an already operating arbitrated loop, and various error recovery operations. FC arbitrated loop initialization comprises seven distinct phases. FIG. 8 shows a diagram of the seven phases of FC arbitrated loop initialization. FIG. 9 shows the data payload of FC frames transmitted by FC nodes in an arbitrated loop topology during each of the seven phases of loop initialization shown in FIG. 9. The data payload for the FC frames used in each of the different phases of loop initialization comprises three different fields, shown as columns 902_904 in FIG. 9. The first field 902 within each of the different data payload structures is the LI_ID field. The LI_ID field contains an 16-bit code corresponding to one of the seven phases of group initialization. The LI_FL field 903 for each of the different data payload layouts shown in FIG. 9 contains various flags, including flags that specify whether the final two phases of loop initialization are supported by a particular FC port. The TL supports all seven phases of loop initialization. Finally, the data portion of the data payload of each of the data payload layouts 904 contains data fields of varying lengths specific to each of the seven phases of loop initialization. In the following discussion, the seven phases of loop initialization will be described with references to both FIGS. 8 and 9.

In the first phase of loop initialization 802, called "LISM," a loop initialization master is selected. This first phase of loop initialization follows flooding of the loop with loop initialization primitives ("LIPs"). All active nodes transmit an LISM FC arbitrated loop initialization frame 906 that includes the transmitting node's 8-byte port name. Each FC port participating in loop initialization continues to transmit LISM FC arbitrated loop initialization frames and continues to forward any received LISM FC arbitrated loop initialization frames to subsequent FC nodes in the arbitrated loop until either the FC port detects an FC frame transmitted by another FC port having a lower combined port address, where a combined port address comprises the D_ID, S_ID, and 8-byte port name, in which case the other FC port will become the loop initialization master ("LIM"), or until the FC port receives back an FC arbitrated loop initialization frame that that FC port originally transmitted, in which case the FC port becomes the LIM. Thus, in general, the node having the lowest combined address that is participating in the FC arbitrated loop initialization process becomes the LIM. By definition, an FL_PORT will have the lowest combined address and will become LIM. At each of the loop initialization phases, loop initialization may fail for a variety of different reasons, requiring the entire loop initialization process to be restarted.

Once an LIM has been selected, loop initialization proceeds to the LIFA phase 804, in which any node having a fabric assigned AL_PA can attempt to acquire that AL_PA. The LIM transmits an FC arbitrated loop initialization frame having a data payload formatted according to the data payload layout 908 in FIG. 9. The data field of this data layout contains a 16-byte AL_PA bit map. The LIM sets the bit within the bit map corresponding to its fabric assigned AL_PA, if the LIM has a fabric assigned AL_PA. As this FC frame circulates through each FC port within the arbitrated loop, each FC node also sets a bit in the bit map to indicate that FC nodes fabric-assigned AL_PA, if that node has a fabric assigned AL_PA. If the data in the bit map has already been set by another FC node in the arbitrated loop, then the FC node must attempt to acquire an AL_PA during one of three subsequent group initialization phases. The fabric assigned AL_PAs provide a means for AL_PAs to be specified by an FC node connected to the arbitrated loop via an FL_Port.

In the LIPA loop initialization phase 806, the LIM transmits an FC frame containing a data payload formatted according to the data layout 910 in FIG. 9. The data field contains the AL_PA bit map returned to the LIM during the previous LIPA phase of loop initialization. During the LIPA phase 910, the LIM and other FC nodes in the arbitrated loop that have not yet acquired an AL_PA may attempt to set bits within the bit map corresponding to a previously acquired AL_PA saved within the memory of the FC nodes. If an FC node receives the LIPA FC frame and detects that the bit within the bit map corresponding to that node's previously acquired AL_PA has not been set, the FC node can set that bit and thereby acquire that AL_PA.

The next two phases of loop initialization, LIHA 808 and LISA 810 are analogous to the above-discussed LIPA phase 806. Both the LIHA phase 808 and the LISA phase 810 employ FC frames with data payloads 912 and 914 similar to the data layout for the LIPA phase 910 and LIFA phase 908. The bit map from the previous phase is recirculated by the LIM in both the LIHA 808 and LISA 810 phases, so that any FC port in the arbitrated loop that has not yet acquired an AL_PA may attempt to acquire either a hard assigned AL_PA contained in the port's memory, or, at last resort, may obtain an arbitrary, or soft, AL_PA not yet acquired by any of the other FC ports in the arbitrated loop topology. If an FC port is not able to acquire an AL_PA at the completion of the LISA phase 810, then that FC port may not participate in the arbitrated loop. The FC-AL-2 standard contains various provisions to enable a nonparticipating node to attempt to join the arbitrated loop, including restarting the loop initialization process.

In the LIRP phase of loop initialization 812, the LIM transmits an FC frame containing a data payload having the data layout 916 in FIG. 9. The data field 917 of this data layout 916 contains a 128-byte AL_PA position map. The LIM places the LIM's acquired AL_PA, if the LIM has acquired an AL_PA, into the first AL_PA position within the AL_PA position map, following an AL_PA count byte at byte 0 in the data field 917, and each successive FC node that receives and retransmits the LIRP FC arbitrated loop initialization frame places that FC node's AL_PA in successive positions within the AL_PA position map. In the final loop initialization phase LILP 814, the AL_PA position map is recirculated by the LIM through each FC port in the arbitrated loop technology so that the FC ports can acquire, and save in memory, the completed AL_PA position map. This AL_PA position map allows each FC port within the arbitrated loop to determine its position relative to the other FC ports within the arbitrated loop.

The SCSI-3 Enclosure Services Commands

During the past decade, it has become increasingly popular for computer peripheral manufacturers to include a number of different peripheral devices within a single enclosure. One example of such enclosures is a redundant array of inexpensive disks ("RAID"). By grouping a number of different peripheral devices within a single enclosure, the peripheral manufacturer can achieve certain economies of manufacture. For example, all of the peripheral devices within the enclosure may share one or more common power supplies, cooling apparati, and interconnect media. Such enclosures may provide a collective set of resources greater than the resource represented by individual peripheral devices. In addition, individual peripheral devices may be swapped in and out of the enclosure while the other peripheral devices within the enclosure continue to operate, a process known as hot-swapping. Finally, banks of such enclosures may be used for storage redundancy and mirroring in order to achieve economical, highly available resources.

Figure 10:
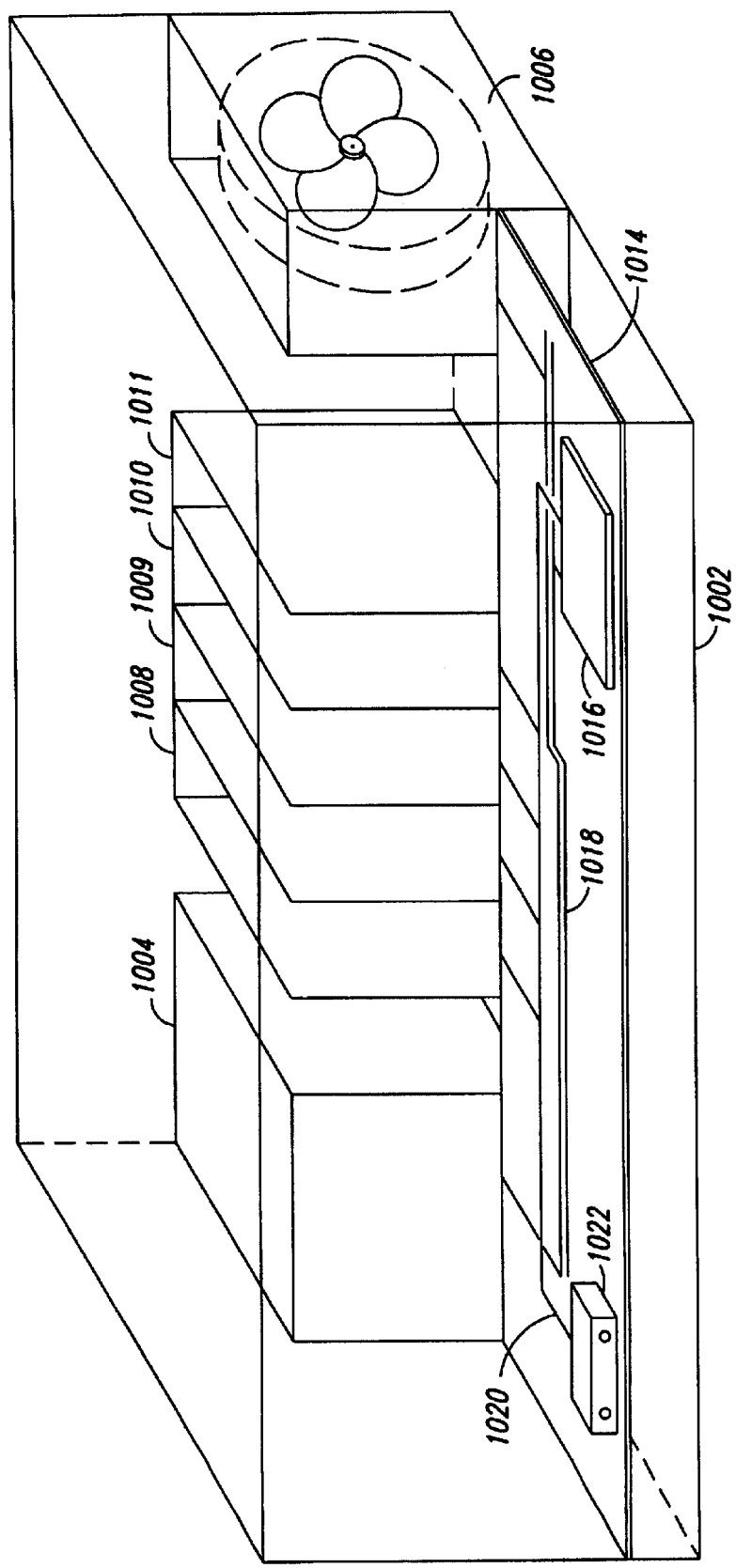
FIG. 10 illustrates a simple multi-peripheral devices enclosure.

FIG. 10 illustrates a simple multi-peripheral devices enclosure. The enclosure 1002 includes a power supply 1004, a cooling fan 1006, four disk drives 1008–1011. A circuit board 1014 within the enclosure includes a processor 1016, an internal bus 1018, and an interconnection medium 1020 that interconnects the processor 1016, the disk drive 1008–1011, and a port 1022 through which the enclosure 1002 can be connected to a host computer (not shown). The host computer may, in some systems, individually address and interact with the disk drives 1008–1011 as well as with the processor 1016, or may instead interact with the enclosure 1002 as if the enclosure represented one very large disk drive with a single address base. The processor 1016 generally runs a process that may monitor status of each of the peripheral devices 1008–1011 within the enclosure 1002 as well as the status of the power supply 1004 and the cooling fan 1006. The processor 1016 communicates with the power supply 1004 and the cooling fan 1006 via an internal communications medium such as, in FIG. 10, an internal bus 1018.

In order to facilitate host computer access to information provided by various components within an enclosure, such as the power supply 1004 and the cooling fan 1006 and in order to provide the host computer with the ability to individually control various components within the enclosure, a SCSI command set has been defined as a communications standard for communications between a host computer and an enclosure services process running within an enclosure, such as enclosure 1002 in FIG. 10. The SCSI Enclosure Services ("SES") command set is described in the American National Standard for Information Technology Standards Document NCITS 305-199X. The SES command set will be defined in a reference standard that is currently still under development by the X3T10 Committee.

Figure 11:
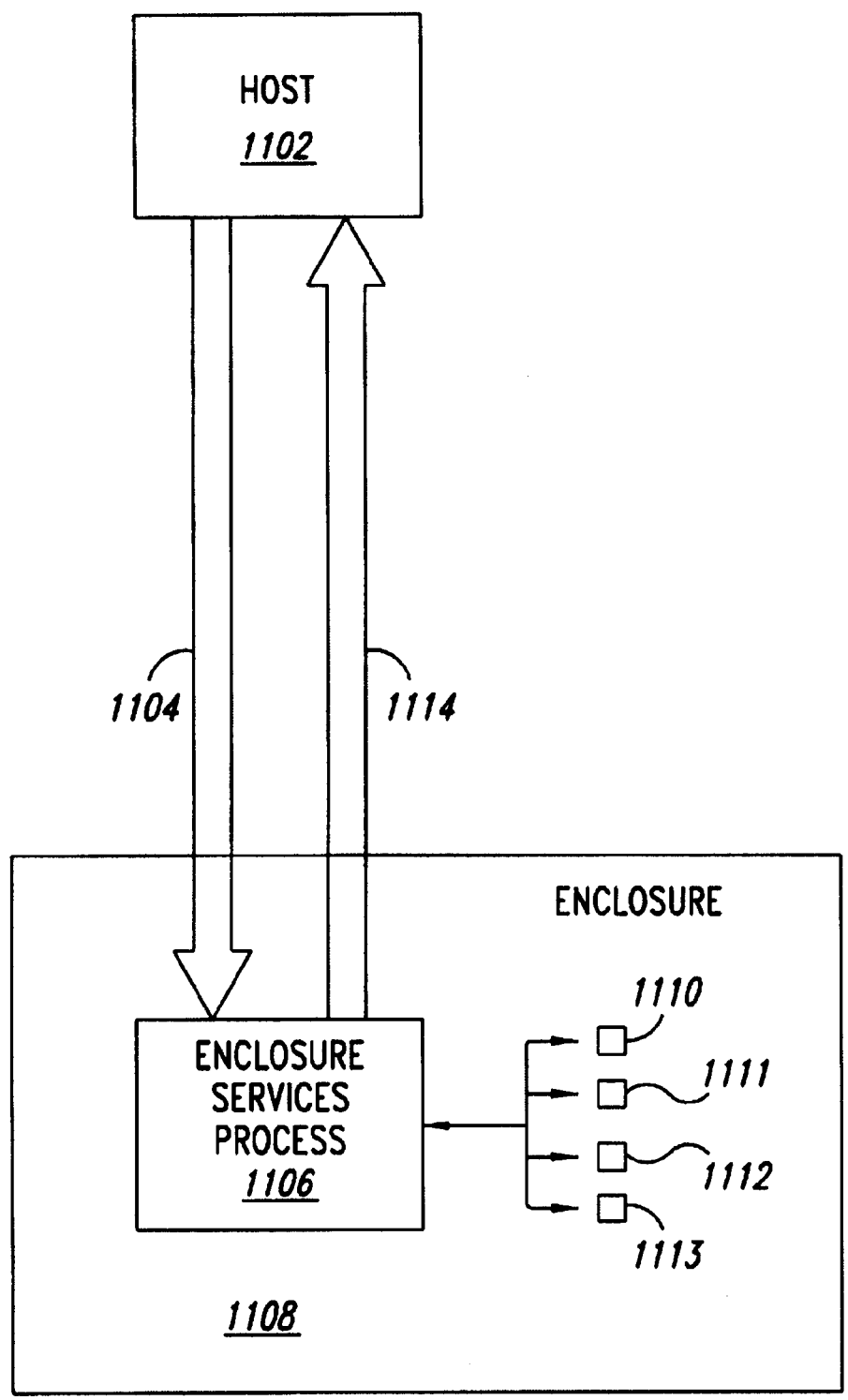
FIG. 11 illustrates the basic communications paradigm represented by the SES command set.

FIG. 11 illustrates the basic communications paradigm represented by the SES command set. A host computer 1102 sends an SES command 1104 to an enclosure services process 1106 running within an enclosure 1108. In FIG. 10, for example, the enclosure services process runs on processor 1016. The enclosure services process 1106 interacts with various components 1110–1113 within the enclosure 1108 and then returns a response 1114 to the SES command sent to the enclosure services process 1106 by the host computer 1102.

There are a number of different types of SES commands and responses to SES commands. The above cited ANSI standard documents may be consulted for details on the various types of commands and responses. In general, the bulk of communications traffic between a host computer 1102 and an enclosure services process 1106 involves two basic commands: (1) the SEND DIAGNOSTICS command by which the host computer transmits control information to the enclosure services process; and (2) the RECEIVE DIAGNOSTIC RESULTS command by which the host computer solicits from the enclosure services process information, including state information, about the various components within an enclosure.

The host computer transmits a SEND DIAGNOSTICS command to the enclosure services process via an enclosure control page. The layout for an enclosure control page is shown below in Table 1.

TABLE 1

Enclosure control page

| Bits Bytes | 7 | 6 | 5 | 4 | 3 | 2 | 1 | 0 |
|---|---|---|---|---|---|---|---|---|
| 0 | | | | PAGE CODE (02H) | | | | |
| 1 | | Reserved | | | INFO | NON-CRIT | CRIT | UN-RECOV |
| 2 | (MSB) | | | | | | | |
| | | | | PAGE LENGTH (N-3) | | | | |
| 3 | | | | | | | | (LSB) |
| 4–7 | | | | GENERATION CODE | | | | |
| 8–11 | | | | OVERALL CONTROL (first element type) | | | | |
| 12–15 | | | | ELEMENT CONTROL (first element of first element type) | | | | |
| | | | | *** | | | | |
| (4 bytes) | | | | ELEMENT CONTROL (last element of first element type) | | | | |
| (4 bytes) | | | | OVERALL CONTROL (second element type) | | | | |
| (4 bytes) | | | | ELEMENT CONTROL (first element of second element type) | | | | |
| | | | | *** | | | | |
| n-3 to n | | | | ELEMENT CONTROL (last element of last element type) | | | | |

The enclosure control page includes an OVERALL CONTROL field for each type of component within an enclosure and an ELEMENT CONTROL field for each discrete component within an enclosure. ELEMENT CONTROL fields for all components of a particular type are grouped together following the OVERALL CONTROL field for that type of component. These control fields have various formats depending on the type of component, or element. The formats for the control fields of the enclosure control page will be described below for several types of devices. The types of elements currently supported by the SES command set are shown below in Table 2

TABLE 2

| Type Code | Type of element | Type Code | Type of element |
|---|---|---|---|
| 00h | Unspecified | 0Dh | Kay pad entry device |
| 01h | Device | 0Eh | Reserved |
| 02h | Power supply | 0Fh | SCSI port/transceiver |
| 03h | Cooling element | 10h | Language |
| 04h | Temperature sensors | 11h | Communication port |
| 05h | Door lock | 12h | Voltage sensor |
| 06h | Audible alarm | 13h | Current sensor |
| 07h | Enclosure services controller electronics | 14h | SCSI target port |
| 08h | SCC controller electronics | 15h | SCSI initiator port |
| 09h | Nonvolatile cache | 16h | Simple sub-enclosure |
| 0Ah | Reserved | 17-7Fh | Reserved |
| 0Bh | Uninterruptible power supply | 80h-FFh | Vendor-specific codes |
| 0Ch | Display | *** | *** |

When a host computer issues a RECEIVED DIAGNOSTIC RESULTS command to the enclosure services process, the enclosure services process collects status information from each of the components, or elements, within the enclosure and returns an enclosure status page to the host computer that contains the collected status information. The layout of the enclosure status page is below in Table 3.

TABLE 3

Enclosure status page

| Bytes\Bits | 7 | 6 | 5 | 4 | 3 | 2 | 1 | 0 |
|---|---|---|---|---|---|---|---|---|
| 0 | | | | PAGE CODE (02H) | | | | |
| 1 | Reserved | | | INVOP | INFO | NON-CRIT | CRIT | UN-RECOV |
| 2 | (MSB) | | | | | | | |
| | | | | PAGE LENGTH (n-3) | | | | |
| 3 | | | | | | | | (LSB) |
| 4-7 | (MSB) GENERATION CODE (LSB) | | | | | | | |
| 8-11 | OVERALL STATUS (first element type) | | | | | | | |
| 12-15 | ELEMENT STATUS (first element of first element type) | | | | | | | |
| | *** | | | | | | | |
| (4 bytes) | ELEMENT STATUS (last element of first element type) | | | | | | | |
| (4 bytes) | OVERALL STATUS (second element type) | | | | | | | |
| (4 bytes) | ELEMENT STATUS (first element of second element type) | | | | | | | |
| | *** | | | | | | | |
| n-3 to n | ELEMENT STATUS (last element of last element type) | | | | | | | |

As with the enclosure control page, described above, the enclosure status page contains fields for particular components, or elements, grouped together following an overall field for that type of component. Thus, the enclosure status page contains an OVERALL STATUS field for each type of element followed by individual ELEMENT STATUS fields for each element of a particular type within the enclosure. The status fields vary in format depending on the type of element. The status field formats for several devices will be illustrated below.

The host computer can issue a RECEIVED DIAGNOSTICS RESULTS command with a special page code in order to solicit from the enclosure service process a configuration page that describes the enclosure and all the components, or elements, within the enclosure. Table 4, below, shows the layout of a configuration page.

TABLE 4

Configuration page

| Component name | Bytes | Field Name |
|---|---|---|
| | | Diagnostic page header |
| | | Generation code |
| Enclosure descriptor header | 8 | Reserved |
| | 9 | SUB-ENCLOSURE IDENTIFIER |
| | 10 | NUMBER OF ELEMENT TYPES SUPPORTED (T) |
| | 11 | ENCLOSURE DESCRIPTOR LENGTH (m) |
| Enclosure descriptor | 12-19 | ENCLOSURE LOGICAL IDENTIFIER |
| | 2-27 | ENCLOSURE VENDOR IDENTIFICATION |
| | 28-43 | PRODUCT IDENTIFICATION |
| | 44-47 | PRODUCT REVISION LEVEL |
| | 48 - (11 + m) | VENDOR-SPECIFIC ENCLOSURE INFORMATION |
| Type descriptor header list | (4 bytes) | TYPE DESCRIPTOR HEADER (first element type) |
| | | *** |
| | (4 bytes) | TYPE DESCRIPTOR HEADER ($T^{Th}$ element type) |
| Type descriptor text | variable | TYPE DESCRIPTOR TEXT (first element type) |
| | | *** |
| | last byte = n | TYPE DESCRIPTOR TEXT ($T^{Th}$ element type) |

The configuration page includes an enclosure descriptor header and an enclosure descriptor that describes the enclosure, as a whole, as well as a type descriptor header list that includes information about each type of component, or element, included in the enclosure and, finally, a type descriptor text list that contains descriptor text corresponding to each of the element types.

Tables 5A–B, below, show the format for an ELEMENT control field in the enclosure control page for a cooling element, such as a fan.

TABLE 5A

Cooling element for enclosure control pages

| Bytes\Bits | 7 | 6 | 5 | 4 | 3 | 2 | 1 | 0 |
|---|---|---|---|---|---|---|---|---|
| 0 | | | | COMMON CONTROL | | | | |
| 1-2 | | | | Reserved | | | | |
| 3 | Rsrvd | RQST FAIL | RQST ON | Reserved | | REQUESTED SPEED CODE | | |

TABLE 5B

REQUESTED SPEED CODE values

| Speed Code | Description |
|---|---|
| 000b | Reserved |
| 001b | Fan at lowest speed |
| 010b | Fan at second lowest speed |
| 011b | Fan at speed 3 |
| 100b | Fan at speed 4 |
| 101b | Fan at speed 5 |
| 110b | Fan at intermediate speed |
| 111b | Fan at highest speed |

Bit fields within the ELEMENT control field allow the host computer to specify to the enclosure services process certain actions related to a particular cooling element. For example, by setting the RQST FAIL bit, the host computer specifies that a visual indicator be turned on to indicate failure of the cooling element. By setting the RQST ON field, host computer requests that the cooling element be turned on and remain on. The REQUESTED SPEED CODE field allows the host computer to specify a particular cooling fan speed at which the cooling element should operate. Table 5B includes the different fan speed settings that can be specified in the requested speed code field.

Tables 6A–B, below, show the layout for a cooling ELEMENT STATUS field within an enclosure status page, shown above in Table 3.

TABLE 6A

Cooling element for enclosure status pages

| Bits Bytes | 7 | 6 | 5 | 4 | 3 | 2 | 1 | 0 |
|---|---|---|---|---|---|---|---|---|
| 0 | COMMON STATUS | | | | | | | |
| 1–2 | Reserved | | | | | | | |
| 3 | Rsrvd | FAIL | RQSTED ON | OFF | Rsrvd | ACTUAL SPEED CODE | | |

TABLE 6B

ACTUAL SPEED CODE values

| Speed Code | Description |
|---|---|
| 000b | Fan stopped |
| 001b | Fan at lowest speed |
| 010b | Fan at second lowest speed |
| 011b | Fan at speed 3 |
| 100b | Fan at speed 4 |
| 101b | Fan at speed 5 |
| 110b | Fan at intermediate speed |
| 111b | Fan at highest speed |

The various bit fields within the cooling ELEMENT STATUS field, shown in Table 6A, indicate to the host computer the state of the particular cooling element, or fan. When the FAIL bit is set, the enclosure services process is indicating that the failure indication for a particular fan has been set on. When the RQSTED ON bit is set, the enclosure services process indicates to the host computer that the fan has been manually turned on or has been requested to be turned on via a SEND DIAGNOSTICS command. When the OFF bit is set, the enclosure services process indicates to the host computer that the fan is not operating. The enclosure services process may indicate to the host computer, via the ACTUAL SPEED CODE field, the actual speed of operation of the fan. Actual speed code values are shown above in Table 6B.

A layout for the ELEMENT CONTROL field for a power supply within the enclosure control page, shown above in Table 1, is shown below in Table 7A. An ELEMENT STATUS field for a power supply element that is included in an enclosure status page, shown above in Table 3, is shown below in Table 7B.

TABLE 7A

Cooling element for enclosure control pages

| Bits Bytes | 7 | 6 | 5 | 4 | 3 | 2 | 1 | 0 |
|---|---|---|---|---|---|---|---|---|
| 0 | COMMON CONTROL | | | | | | | |
| 1–2 | Reserved | | | | | | | |
| 3 | Rsrvd | RQST FAIL | RQST ON | | Reserved | | | |

TABLE 7B

Power supply element for enclosure status pages

| Bits Bytes | 7 | 6 | 5 | 4 | 3 | 2 | 1 | 0 |
|---|---|---|---|---|---|---|---|---|
| 0 | COMMON STATUS | | | | | | | |
| 1 | Reserved | | | | | | | |
| 2 | Reserved | | | DC over-voltage | DC under-voltage | DC over-current | Rsrvd | |
| 3 | Rsrvd | FAIL | RQSTED ON | OFF | OVRTMP FAIL | TEMP WARN | AC FAIL | DC FAIL |

Many of the fields in the power supply control and status fields are similar to those in the cooling element control and status fields of Tables 5A and 6A, and will not be further discussed. The power supply status field also includes bit fields to indicate under-voltage, over-voltage, over-current, power failure, and other temperature conditions.

The SES command set and SES protocol specify a standard SCSI communication between a host computer and an enclosure including multiple peripheral devices. The SES protocol allows the host computer to control operation of individual peripheral devices within the enclosure and also to acquire information about the status of operation of the peripheral devices Multi-Disk Enclosures The highbandwidth and flexible connectivity provided by the FC, along with the ability of the FC to support the SES command set and protocol, have made the FC an attractive communications medium for interconnecting host processors with enclosures containing multiple peripheral devices and for interconnecting the multiple peripheral devices within enclosures. In the following discussions, enclosures will be described and represented as containing multiple disk drives. However, the described techniques and approaches for interconnecting multiple disk drives within an enclosure, and for interconnecting enclosures and host computers, are equally applicable for other types of peripheral devices.

Figure 12:
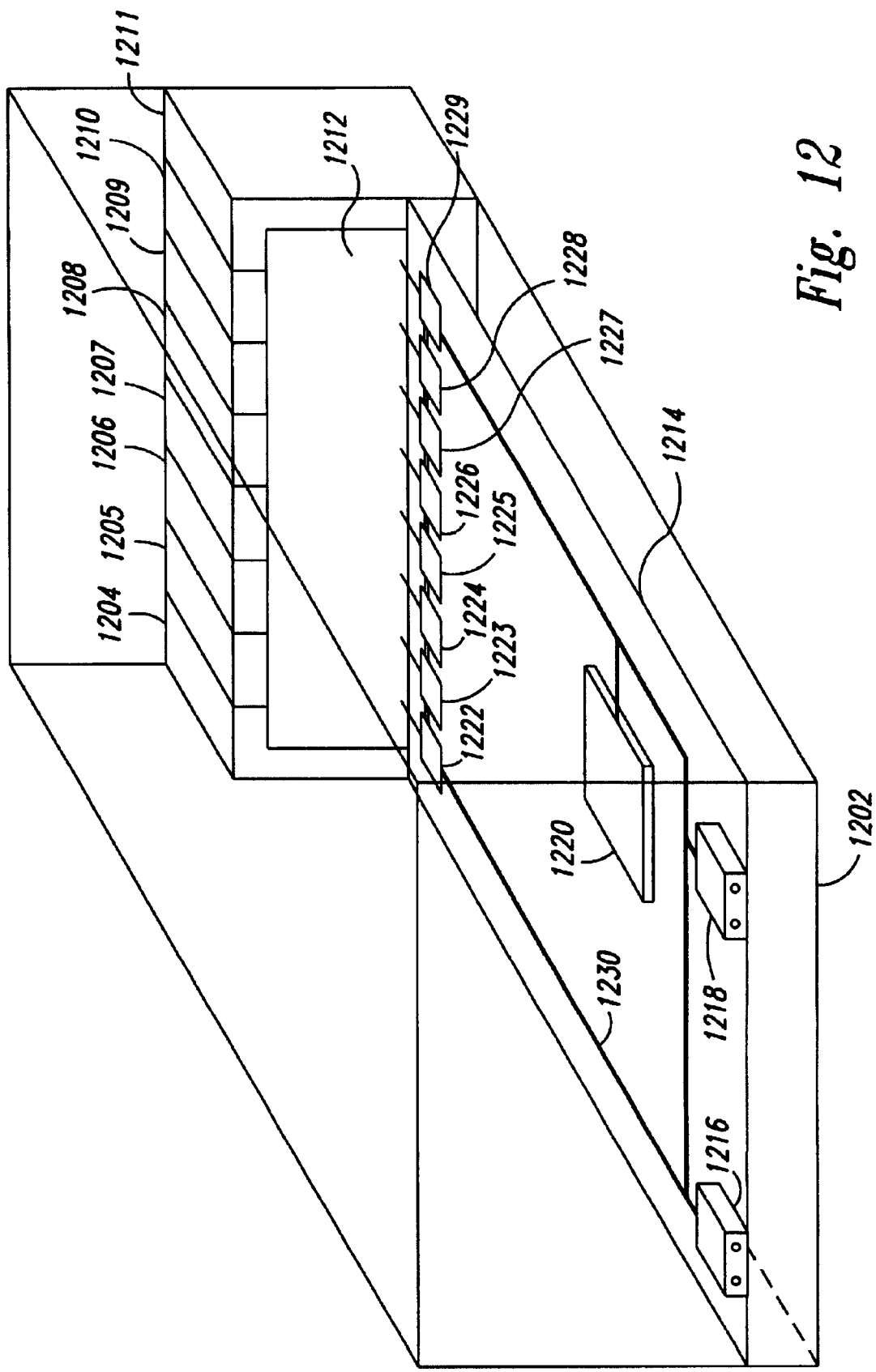
FIG. 12 is a simplified illustration of the design used by manufacturers of certain currently-available FC-based multi-disk enclosures.

FIG. 12 is a simplified illustration of the design used by manufacturers of certain currently-available FC-based multi-disk enclosures. The enclosure 1202 is shown in FIG. 12 containing 8 disks drives 1204–1211. The disk drives are plugged into, and interconnected by, a backplane 1212. A multi-component circuit board 1214 is also plugged into the backplane 1212. Two giga-bit interface converters ("GBICs") 1216 and 1218 provide external fibre optic cable connection to the enclosure 1202. The circuit board 1214 contains a processor 1220 and a number of port bypass circuits ("PBCs") 1222–1229 that are interconnected by an internal FC loop 1230. An enclosure services process runs on the processor 1220 to allow the host computer (not shown) to control various additional components within the enclosure, such as fans, power supplies, temperature sensors, etc., as discussed in the previous subsection. The individual disk drives 1204–1211 of the enclosure may be replaced, removed, or added during operation of the other disk drives of the enclosure. Hot-swapping is made possible in the currently-available systems illustrated in FIG. 12, by the port bypass circuits 1222–1229. When a disk is present and functioning, the FC signal passes from the FC loop 1230 through the port bypass circuit (for example, port bypass circuit 1225) to the disk drive (for example, disk drive 1207). When a disk drive is removed, the port bypass circuit instead routes the FC signal directly to the next port bypass circuit or other component along the FC loop 1230. For example, if disk drive 1207 is removed by hot-swapping, FC signals will pass from disk drive 1206 through port bypass circuit 1224 to port bypass circuit 1225 and from port bypass circuit 1225 directly to port bypass circuit 1226.

A single GBIC (for example, GBIC 1216) allows connection of the enclosure to a host computer via an optical fibre. A second GBIC (for example, GBIC 1218) may allow an enclosure to be daisy-chained to another enclosure, thereby adding another group of disk drives to the fibre channel loop 1230. When a second GBIC is present, and no further enclosures are to be daisy-chained through the second GBIC, a loop-back connector, or terminator, is normally plugged into the second GBIC to cause FC signals to loop back through the enclosure and, ultimately, back to the host computer.

Figure 13A:
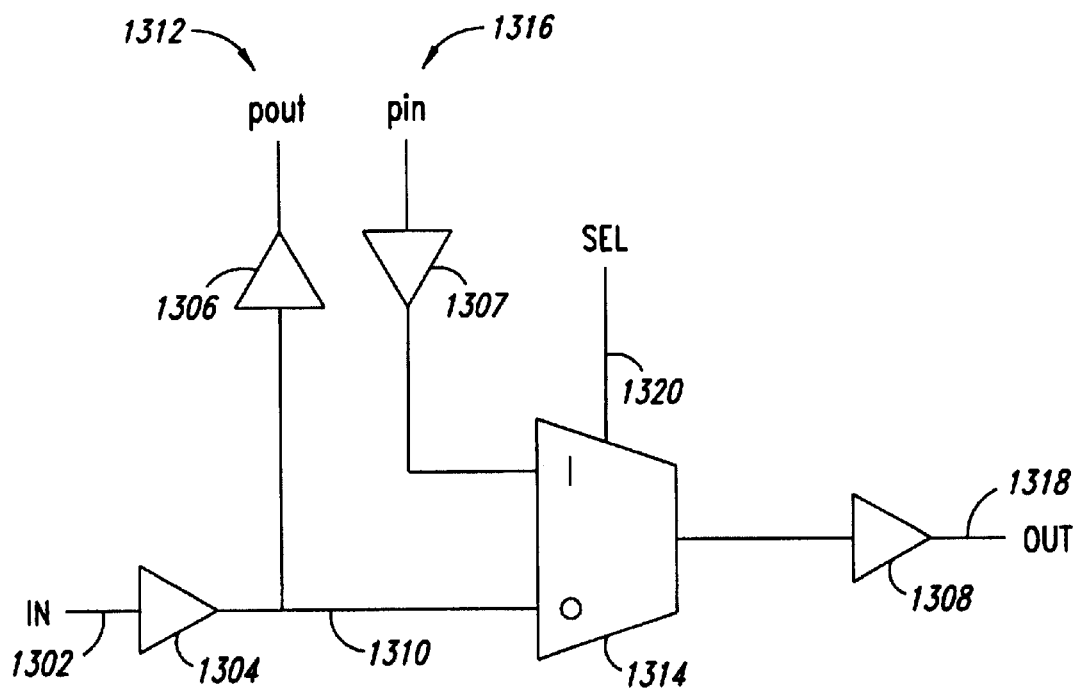
FIG. 13A is a schematic representation of a port bypass circuit, such as port bypass circuits 1222–1229 in FIG. 12.

FIG. 13A is a schematic representation of a port bypass circuit, such as port bypass circuits 1222–1229 in FIG. 12. An input FC signal ("IN") 1302 passes through a summing amplifier 1304 to convert the differentially-encoded FC signal into a linear signal used within the PBC circuitry. Summing amplifiers 1306–1308 are similarly employed to interconvert linear and differential signals. The converted input signal 1310 is split and passed to a buffered output ("Pout") 1312 and to a multiplexer 1314. A second FC input signal ("Pin") 1316 passes through summing amplifier 1307 and is input to the multiplexer 1314. The FC output signal ("OUT") 1318 from the multiplexer 1314 is controlled by the SEL control input line 1320. When the SEL control input line is asserted, the multiplexer 1314 passes the Pin input 1316 to the output signal 1318. When the SEL control input line is de-asserted, the multiplexer 1314 passes the IN input signal 1302 to the output signal OUT 1318.

Figure 13B:
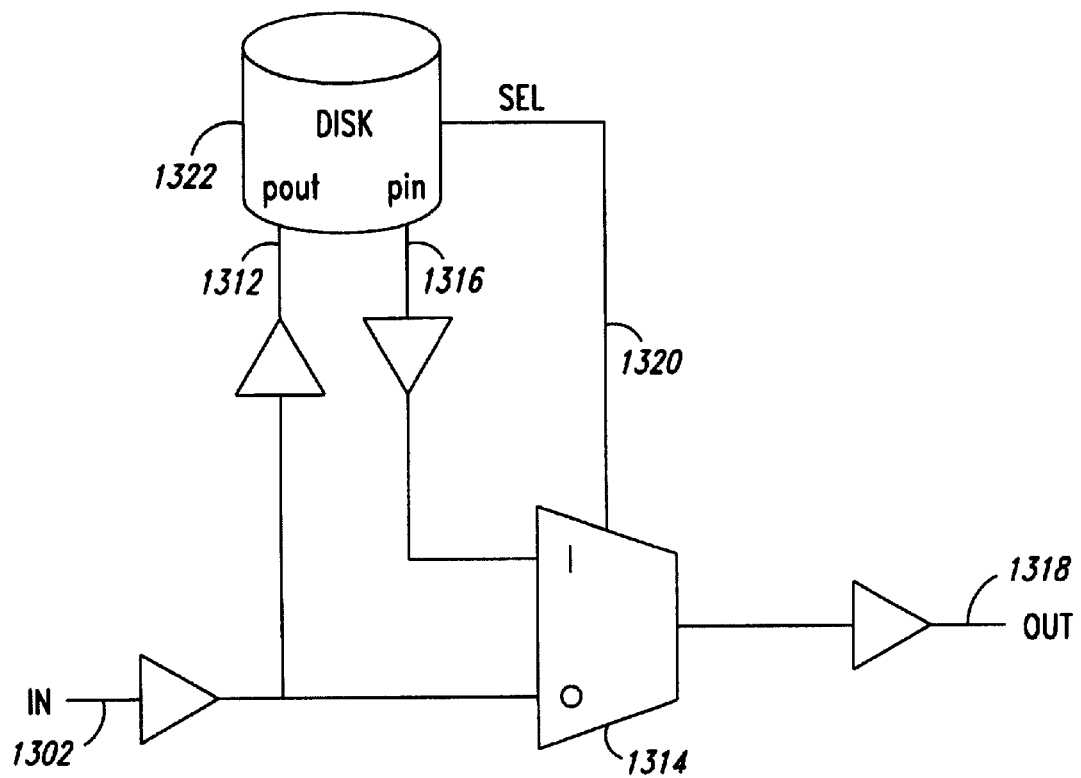
FIG. 13B illustrates the connection of a disk drive to a fibre channel loop via a port bypass circuit.

FIG. 13B illustrates the connection of a disk drive to a fibre channel loop via a port bypass circuit. In the interest of brevity, the components of the port bypass circuit in 13B that are the same as components shown in FIG. 13A will be labeled in 13B with the same labels used in FIG. 13A, and descriptions of these components will not be repeated. The disk drive 1322 receives an input signal IN 1302 from the fibre channel loop via the Port signal 1312. When the disk drive asserts the SEL control signal 1320, the disk drive provides the signal Pin 1316 that is passed by the multiplexer 1314 to the output signal OUT 1318 that is transmitted via the FC loop to the next FC port in the direction of the FC signal. When the SEL control signal 1320 is de-asserted, the disk drive 1322 is bypassed, and the input signal IN 1302 is passed as the output signal OUT 1318 to the next FC port in the direction of the FC signal. The disk drive 1322 asserts the SEL control signal when it is securely mounted in the enclosure, connected to the backplane, and functionally ready to inter-operate with the FC loop. When the disk drive 1322 is absent, or not functionally ready to inter-operate with the FC loop, the SEL control line 1320 is de-asserted and the FC signal bypasses the disk drive. When the disk drive is hot-swapped into or out of an on-line enclosure, the FC loop that interconnects the functioning disk drives must undergo re-initialization, as discussed above, but the ensuing interruption is relatively slight, and any interrupted data transfers are recovered. However, there are different possible failure modes of disk drives that can degrade or disable operation of the FC loop and that cannot be detected and bypassed by the essentially passive PBC. For example, a disk drive may intermittently transmit spurious signals, or may fail to yield control of the FC loop after transmitting requested data. Thus, although the passive PBCs allow for hot-swapping of disk drives, they do not provide the high level of component malfunction detection and recovery necessary in high-availability systems.

The Present Invention

The method and system of the present invention are related to a new type of multi-peripheral-device enclosure that provides increased reliability, increased fault tolerance, and higher availability. Again, as in the previous subsection, this new multi-peripheral-device enclosure will be illustrated and described in terms of a multi-disk enclosure. However, the techniques and methods of the present invention apply generally to enclosures that may contain different types of peripheral devices in different combinations. The method and system of the present invention will be discussed with regard to enclosures based on FC interconnection between the host computer and the enclosure as well as between various peripheral devices within the enclosure. However, other types of communications media may be employed in place of the FC. Finally, the method and system of the present invention are discussed with regard to a multi-disk enclosure in which the SES command set and protocol provide component-level control to the host computer. However, this component-level control may be provided by other types of protocols and command sets.

Figure 14:
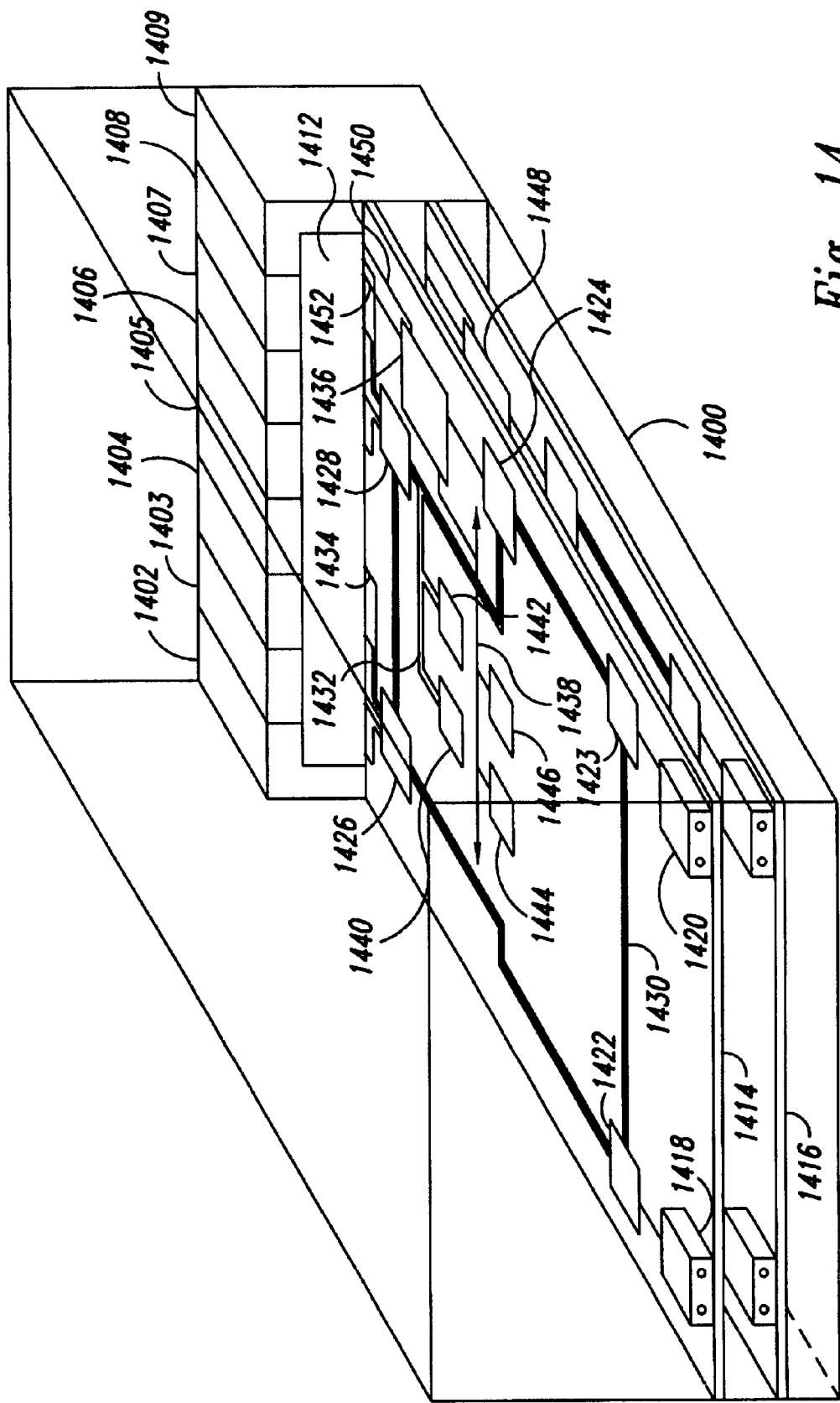
FIG. 14 shows a highly available enclosure that incorporates techniques related to the present invention.

FIG. 14 shows a highly available enclosure that incorporates techniques related to the present invention. The highly available enclosure ("HAE") shown in FIG. 14 includes 8 disk drives 1402–1409. The disk drives 1402–1409 are plugged into a backplane 1412 that interconnects the disk drives with other components in the HAE, and that also interconnects certain of the other components in the HAE independently from the disk drives. The backplane 1412 is passive. It contains no active components, such as processing elements, and is thus highly unlikely to become a point of failure within the HAE. The two link control cards ("LCCs") 1414 and 1416 are coupled to the backplane. The two LCCs are essentially identical. Only the components included in the top LCC 1414 will be described and labeled. An LCC contains two GBICs 1418 and 1420, a number of port bypass circuits 1422–1424, and several port bypass circuit chips 1426 and 1428, each of which contains four separate port bypass circuits. The port bypass circuits and port bypass circuit chips are interconnected both by an FC loop, indicated in FIG. 14 by the single heavy line, for example line 1430 interconnecting port bypass circuits 1422 and 1423, and a port bypass circuit bus 1432. In FIG. 14, port bypass circuits may be shown interconnected by both a port bypass circuit bus as well as an FC loop as, for example, the interconnection between port bypass circuits 1422 and 1423. The port bypass circuit chips 1426 and 1428 fan out Pout, Pin, and SEL control line signals, represented collectively in FIG. 14 by a single line, such as line 1434, to the 8 disk drives 1402–1409. Each port bypass circuit chip controls FC loop access to four disk drives. The LCC contains a processor 1436, which runs an enclosure services process and other control programs. This processor 1436 includes circuitry that implements an FC port as well as ports to three different internal busses. One of the internal busses 1438, in a preferred embodiment an $I^2$ C bus, interconnects the processor 1436 with PBC controller chips 1440 and 1442 and with other components such as temperature sensing devices and power monitoring devices 1444 and 1446. The processor on one LCC 1436 is interconnected with the processor on the other LCC 1448 by two separate internal busses 1450 and 1452 that run through the backplane 1412.

The HAE is highly redundant. The disk drives 1402–1409 are interconnected by two separate FC loops implemented, in part, on the two LCC cards 1414 and 1416. Thus, if one FC loop fails, a host computer (not shown) can nonetheless access and exchange data with the disk drives in the enclosure via the other FC loop. In similar fashion, if one internal bus that interconnects the two processors 1436 and 1448 fails, the two processors can communicate via the other internal bus. Although not shown in FIG. 14, the HAE includes dual power supplies and other redundant components. Each of the two processors controls one of the two redundant components, such as one power supply, to ensure that a failing processor is not able to shut down both power supplies and thus disable the HAE. The port bypass circuits, as in the currently-available enclosures described above, allow for hot-swapping of disk drives. However, because the port bypass circuits are themselves controlled by port bypass circuit controllers 1440 and 1442, additional higher-level control of the components can be achieved. For example, a faulty disk drive can be identified and isolated by a software routine running on the processor 1436 which can then signal a port bypass circuit controller to forcibly bypass a particular disk drive. Redundant environmental monitors allow for vigilant fault-tolerant monitoring of the conditions within the HAE of both processors. Failure of any particular sensor or interconnecting internal bus will not produce a failure of the entire HAE.

Figure 15A:
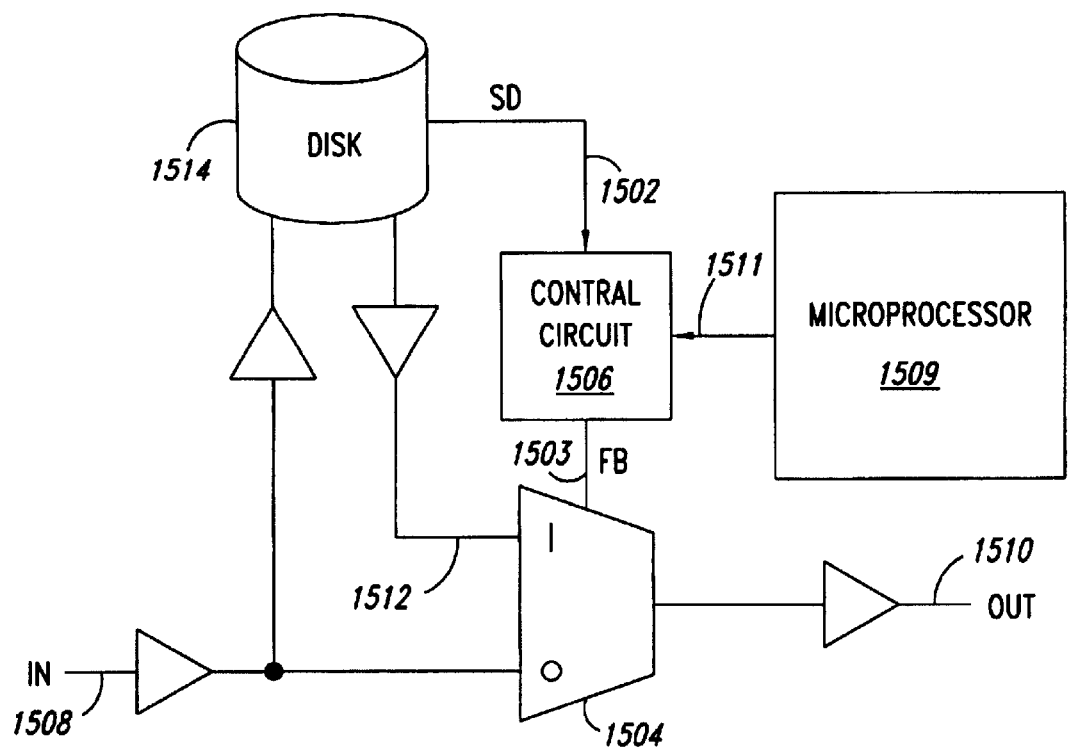
FIG. 15A illustrates control of a port bypass circuit by a port bypass circuit control chip.

FIG. 15A illustrates control of a port bypass circuit by a port bypass circuit control chip. The circuit illustrated in FIG. 15A is similar to the circuit shown in FIG. 13B above. However, the control signal line, in this circuit designated the "SD" control signal line 1502, does not directly control output of the multiplexer 1504. Instead, the SD control signal line 1502 is input to a PBC control circuit 1506. This PBC control circuit may be implemented by a microprocessor or may be implemented based on state-machine logic. The PBC control circuit 1506 outputs a forced bypass control circuit line ("FB") that determines, as in the circuit in 13B, whether the input signal IN 1508 is passed through to the output signal OUT 1510 or whether, instead, the Pin signal 1512 is passed by the multiplexer 1504 to the output signal OUT 1510. The PBC control circuit 1506 can also exchange data with the microprocessor 1509 via a serial bus 1511 or some other type of communication media. The microprocessor 1509 can indicate to the PBC control circuit 1506 that the PBC control circuit 1506 should assert the FC control signal 1503 in order to bypass the disk drive 1514.

Thus, in the circuit shown in FIG. 15A, several additional levels of control are available besides the control exerted by the disk 1514 via signal line SD 1502. The PBC control circuit 1506 may forcibly bypass the disk 1514 according to an internal set of rules, and a program running within the microprocessor 1509 can cause the disk 1514 to be forcibly bypassed via data transmitted to the PCB control circuit 1506. These additional levels of control allow for microprocessor-controlled bypass of individual disk drives following detection of disk malfunction or critical events signaled by environmental monitors and other such sensors.

Figure 15B:
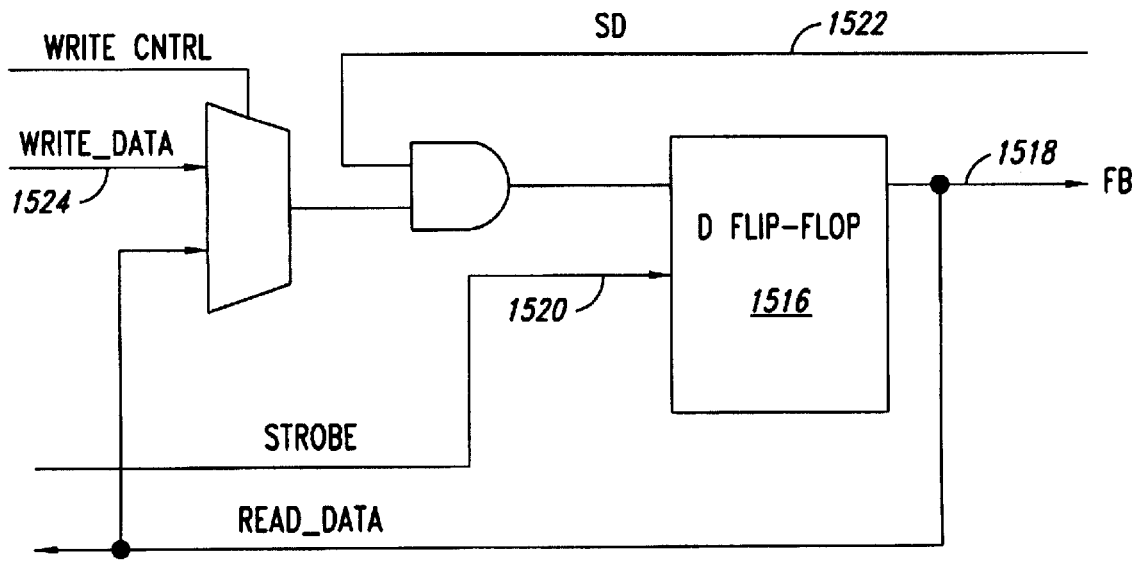
FIG. 15B shows an example of the PBC control circuit implemented in hardware.

FIG. 15B shows an example of the PBC control circuit implemented in hardware. A D flip-flop 1516 outputs the forced bypass signal FB 1518. The D flip-flop changes state upon receiving a strobe input signal 1520. The D flip-flop receives input from the SD control signal line 1522 and the write_data 1524 input from the microprocessor. The strobe signal is generated whenever the SD control line changes state or whenever there is a microprocessor write operation. The D flip-flop can be set or cleared based on changes either to the SD input 1512, or by changes to write data 1524 input from a microprocessor. The forced bypass signal FB tracks the SD control signal 1522, but may be overridden by microprocessor control. Thus, the control circuit of 15B, when included as PBC control circuit 1506 in FIG. 15A, allows circuit 15A to function identically to the circuit of FIG. 13A except in the case that the microprocessor elects to forcibly bypass the disk, rather than depend on the disk to bypass itself.

Figure 16A:
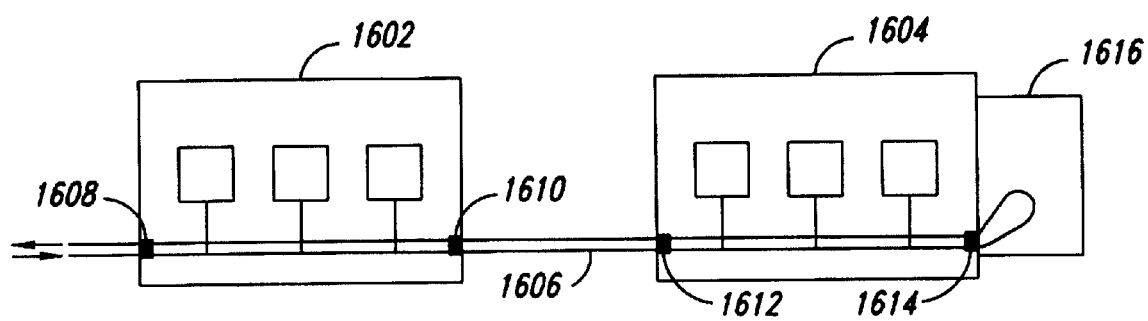
FIGS. 16A–B illustrate the usefulness of implementing a shunting operation in order to bypass a GBIC.
Figure 16B:
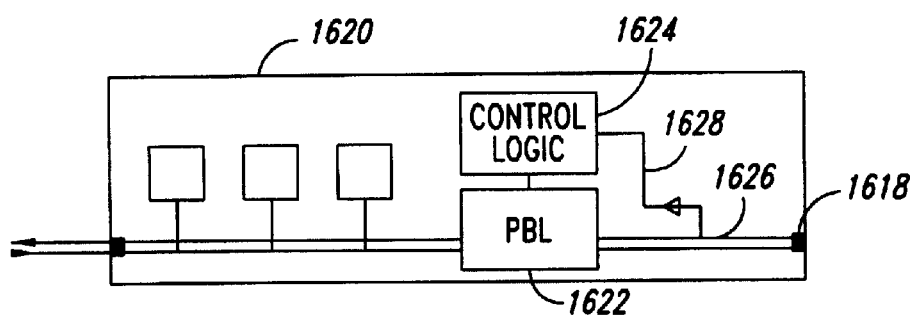

The enhanced PBC control circuit of FIG. 15A is also used in the HAE to implement various shunting operations. For example, PBC circuits 1422 and 1423 in FIG. 14 can be controlled by PBC controllers 1440 and 1442 to bypass GBICs 1418 and 1420, respectively. FIGS. 16A–B illustrate the usefulness of implementing a shunting operation in order to bypass a GBIC. In FIG. 16A, two HAEs 1602 and 1604, are schematically shown daisy-chained together via a single FC loop 1606. The FC optical fibre incoming from the host computer (not shown) connects through a first GBIC 1608 to the first HAE 1602. The FC loop exits the first HAE 1602 at GBIC 1610 and enters the second HAE 1604 at GBIC 1612. Finally, the FC loop exits the second HAE 1604 at GBIC 1614 and returns to the host computer via a return path. The FC circuit is looped back from GBIC 1614 using an external loop back hood 1616.

There are problems associated with the simple form of daisy-chaining illustrated in FIG. 16A. First, certain malfunctions within the second HAE 1604 might bring down the entire FC loop, including the first HAE 1602. Thus, HAEs cannot be readily isolated and bypassed when they are daisy-chained according to the scheme of FIG. 16A. Also, the external loop back hood 1616 is an additional component that adds cost to the overall system, may cause problems in installation, and provides yet another source of single-point failure.

The above-noted deficiencies related to the daisy-chaining of FIG. 16A can be overcome using shunt operations controlled by PBC control logic circuits. FIG. 16B shows a HAE, schematically diagramed as in FIG. 16A, with the functionality provided by the external loop back hood 1616 of FIG. 16A instead implemented via a PBC. In FIG. 16B, the rightmost GBIC 1618 of HAE 1620 is controlled by PBC 1622. PBC 1622 is, in turn, controlled by a PBC controller 1624 which may, in turn, be controlled by the microprocessor (not shown). The return FC signal 1626 is fed back into the PBC controller 1624, following conversion, as a control signal line 1628. When the GBIC 1618 is connected to a fibre optic cable that is, in turn, connected to another HAE, the FC return signal 1626 causes the control signal line 1628 to be asserted, and causes the PBC controller 1624 to control the PBC 1622 to pass FC signals between the HAE and an external additional HAE. However, when the HAE is not connected via GBIC 1618 and a fibre optic cable to another HAE, the control signal line 1628 will be de-asserted, causing the PBC controller 1624 to control the PBC 1622 to bypass the GBIC 1618 and thus looping the FC signal back via a return path to the host computer. This mechanism eliminates the need for an external loop back hood 1616, and provides for automatic sensing of daisy-chained enclosures. Moreover, if an enclosure downstream from HAE 1620 malfunctions, the host computer (not shown) may interact with the microprocessor within the HAE (also not shown) to direct the PBC controller 1624 to forcibly bypass the GBIC 1618 via the PBC 1622, thus removing downstream enclosures from the FC loop. Thus, defective enclosures can be isolated and removed via microprocessor-controlled shunting of GBICs.

Although the present invention has been described in terms of a particular embodiment, it is not intended that the invention be limited to this embodiment. Modifications within the spirit of the invention will be apparent to those skilled in the art. For example, the present invention may be practiced in multi-peripheral-device enclosures that use different inter and intra-enclosure communications media than the FC communications medium employed in the above-described embodiment. As another example, in number of different types of controllers, microprocessors, and port bypass circuits can be used in any number of different configurations to provide the three-tiered port bypass circuit control strategy of the present invention. Additional redundancies in controllers, microprocessors, communications busses, and firmware and software routines can be employed to further increase reliability of a multi-peripheral-device enclosure designed according to the method of the present invention.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. An externally controllable bypass circuit for controlling access by a device to a communications medium, the bypass circuit comprising:
   an IN input from the communications medium;
   an OUT output to the communications medium;
   a Pout output of the IN input to the device;
   a Pin input from the device;
   a control signal line SD output from the device; and
   a multiplexing component that receives the IN input, the Pin input, and a FB control signal line that causes the multiplexing component to output the Pin input to the OUT output when the FB signal line is in a first state and that causes the multiplexing component to output the IN input to the OUT output when the FB signal line is in a second state.

2. The externally controllable bypass circuit of claim 1 wherein the device places the control signal line SD into a first state when the device is installed and ready to exchange data with the communications medium and wherein the control signal line has a second state when the device is not installed and when the device is not ready to exchange data with the communications medium.

3. The externally controllable bypass circuit of claim 1 wherein a bypass circuit controller receives the SD control signal line from the device and outputs the FB control signal line to the multiplexing component.

4. The externally controllable bypass circuit of claim 3 wherein the bypass circuit controller exchanges READ/WRITE data with a processor.

5. The externally controllable bypass circuit of claim 4 wherein the bypass circuit controller is microprocessor-based.

6. The externally controllable bypass circuit of claim 4 wherein the bypass circuit controller is implemented as a state machine.

7. The externally controllable bypass circuit of claim 4 wherein the bypass circuit controller controls access of the device to the communications medium based on the state of the SD control signal line and on logic and rules incorporated into the bypass circuit controller.

8. The externally controllable bypass circuit of claim 4 wherein the bypass circuit controller controls access of the device to the communications medium based the state of the SD control signal line and on data received from the processor.

9. An interconnection shunt within a multi-device enclosure comprising:
   an inter-multi-device-enclosure communications medium connector that interconnects an internal communications medium within the multi-device enclosure with an external communications medium;
   an externally controllable bypass circuit that controls access by the inter-multi-device-enclosure communications medium connector to the external communications medium; and
   control logic embodied within a controller that controls the externally controllable bypass circuit, via the inter-multi-device-enclosure communications medium connector, to connect the internal communications medium with the external communications medium to interconnect the multi-device enclosure with a host computer and with a number of other multi-device enclosures, and to disconnect the internal communications medium from the external communications medium in order to isolate the multi-device enclosure from a host computer and from a number of other multi-device enclosures.

10. The interconnection shunt of claim 9 wherein the internal and external communications media are both parts of a fibre channel arbitrated loop, wherein the interconnection shunt controls access from an expansion inter-multi-device-enclosure communications medium connector to a downstream portion of the fibre channel arbitrated loop, and wherein, when the controller detects signal from a downstream multi-device enclosure, the controller directs the interconnection shunt to interconnect the multi-device enclosure with the downstream portion of the fibre channel arbitrated loop, and when the controller detects no signal from a downstream multi-device enclosure, the controller directs the interconnection shunt to disconnect the multi-device enclosure from the downstream portion of the fibre channel arbitrated loop.

11. The interconnection shunt of claim 9 wherein the internal and external communications media are both parts of a fibre channel arbitrated loop, wherein the interconnection shunt controls access from a primary inter-multi-device-enclosure communications medium connector to an upstream portion of the fibre channel arbitrated loop, and wherein, when the controller determines that the multi-device enclosure should be interconnected with a host computer and other devices connected to the upstream portion of the fibre channel arbitrated loop, the controller directs the interconnection shunt to interconnect the multi-device enclosure with the upstream portion of the fibre channel arbitrated loop, and when the controller determines that the multi-device enclosure should be isolated from a host computer and other devices connected to the upstream portion of the fibre channel arbitrated loop, the controller directs the interconnection shunt to disconnect the multi-device enclosure from the upstream portion of the fibre channel arbitrated loop.

12. The interconnection shunt of claim 9 wherein the controller that controls the externally controllable bypass circuit is microprocessor-based.

13. The interconnection shunt of claim 9 wherein the controller that controls the externally controllable bypass circuit is implemented as a state machine.

14. The interconnection shunt of claim 9 wherein the controller is itself controlled by data received from a processor.

15. A method for controlling access of a data exchanging component within a multi-peripheral-device enclosure to a communications medium, the method comprising:

connecting an input from the communications medium to the data exchanging component;

connecting the input from the communications medium to a multiplexing component;

connecting an output from the multiplexing component to the communications medium;

connecting output from the data exchanging component to the multiplexing component; and connecting a controller to the multiplexing component via an FB control signal line to select output from the multiplexing component to the communications medium.

16. The method of claim 15 wherein the data exchange element is a peripheral device, wherein the communications medium is internal within the multi-peripheral-device enclosure and interconnects peripheral devices within the multi-peripheral-device enclosure, wherein the controller receives a control signal from peripheral device via a control signal line, and wherein the controller sets the state of the FB control signal line to a first state in order to interconnect the peripheral device with the internal communications medium and sets the state of the FB control signal line to a second state in order to disconnect the peripheral device from the internal communications medium.

17. The method of claim 15 wherein the data exchange element is an inter-multi-peripheral-device-enclosure connector, wherein the communications medium is external to the multi-peripheral-device enclosure and interconnects the multi-peripheral-device enclosure with external devices, and wherein the controller sets the state of the FB control signal line to a first state in order to interconnect the multi-peripheral-device enclosure with the external communications medium and sets the state of the FB control signal line to a second state in order to disconnect the multi-peripheral-device enclosure from the external communications medium.

18. The method of claim 17 wherein the inter-multi-peripheral-device-enclosure connector connects the multi-peripheral-device enclosure with a host computer.

19. The method of claim 17 wherein the inter-multi-peripheral-device-enclosure connector connects the multi-peripheral-device enclosure with another multi-peripheral-device enclosure.

20. The method of claim 15 wherein the communications medium is a fibre channel arbitrated loop.

* * * * *